US012620838B2

(12) United States Patent
Sumiya et al.

(10) Patent No.: US 12,620,838 B2
(45) Date of Patent: May 5, 2026

(54) CONTACTLESS POWER FEEDING APPARATUS AND CONTACTLESS POWER FEEDING SYSTEM

(71) Applicant: DENSO CORPORATION, Kariya-city (JP)

(72) Inventors: Hayato Sumiya, Kariya-city (JP); Eisuke Takahashi, Kariya-city (JP); Nobuhisa Yamaguchi, Kariya-city (JP); Kazuyoshi Obayashi, Kariya-city (JP); Shimpei Takita, Kariya-city (JP); Koji Mazaki, Kariya-city (JP); Mitsuru Shibanuma, Kariya-city (JP); Masaki Kanesaki, Kariya-city (JP); Takuya Kiguchi, Kariya-city (JP); Kazuhiro Uda, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 19/011,773

(22) Filed: Jan. 7, 2025

(65) Prior Publication Data

US 2025/0149926 A1 May 8, 2025

Related U.S. Application Data

(60) Division of application No. 17/150,351, filed on Jan. 15, 2021, now abandoned, which is a continuation of
(Continued)

(30) Foreign Application Priority Data

Jul. 18, 2018 (JP) ................................. 2018-135060
Mar. 4, 2019 (JP) ................................. 2019-038160

(51) Int. Cl.
H02J 50/70 (2016.01)
H02J 50/00 (2016.01)
(Continued)

(52) U.S. Cl.
CPC ............ *H02J 50/70* (2016.02); *H02J 50/005* (2020.01); *H02J 50/402* (2020.01); *H02J 50/90* (2016.02)

(58) Field of Classification Search
CPC .......... H02J 50/70; H02J 50/40; H02J 50/402; H02J 50/10; H02J 50/80; H02J 50/12; B60L 53/12; B60L 53/122
See application file for complete search history.

(56) References Cited

U.S. PATENT DOCUMENTS

2015/0298559 A1* 10/2015 Keeling ................. H02J 50/12
320/108
2016/0352154 A1* 12/2016 Matsui ................ H02J 7/00302
(Continued)

FOREIGN PATENT DOCUMENTS

JP H06-29128 A 2/1994
JP 2013-247822 A 12/2013
(Continued)

OTHER PUBLICATIONS

Jul. 23, 2019 Search Report issued in International Patent Application No. PCT/JP2019/020245.

*Primary Examiner* — Rexford N Barnie
*Assistant Examiner* — Rasem Mourad
(74) *Attorney, Agent, or Firm* — Oliff PLC

(57) ABSTRACT

A contactless power feeding apparatus includes a plurality of primary coils mounted on a road and a power feed controller which uses a portion of the primary coils as a power transmitting coil to achieve delivery of electrical power from the power transmitting coil to a secondary coil mounted in a vehicle. The power feed controller uses a selected primary coil that is one of the primary coils other than the power transmitting coil to decrease a leakage of magnetic flux arising from excitation of the power transmitting coil.
(Continued)

Instead of the selected primary coil, the secondary coil may be used to reduce the leakage of magnetic flux.

8 Claims, 28 Drawing Sheets

Related U.S. Application Data application No. PCT/JP2019/020245, filed on May 22, 2019.

(51) Int. Cl.
  *H02J 50/40*          (2016.01)
  *H02J 50/90*          (2016.01)

(56) References Cited

U.S. PATENT DOCUMENTS

| | | | |
|---|---|---|---|
| 2017/0069415 A1 | 3/2017 | Faley et al. | |
| 2017/0222490 A1 | 8/2017 | Boys et al. | |
| 2017/0264142 A1* | 9/2017 | Ogawa | H02J 50/12 |
| 2019/0140481 A1* | 5/2019 | Keeling | H02J 50/005 |
| 2019/0270388 A1* | 9/2019 | Ogawa | B60L 53/12 |

FOREIGN PATENT DOCUMENTS

| JP | 2014-110726 A | 6/2014 |
|---|---|---|
| JP | 2015-192505 A | 11/2015 |
| JP | 2015-211538 A | 11/2015 |
| JP | 2015-220345 A | 12/2015 |

* cited by examiner $$Rm = \frac{L-2g}{\mu_r \, \mu_0 A} + \frac{2g}{\mu_1 \, \mu_0 A} = \frac{L}{\mu' \, \mu_0 A}$$

CUTOUT WIDTH g

FIG.16D

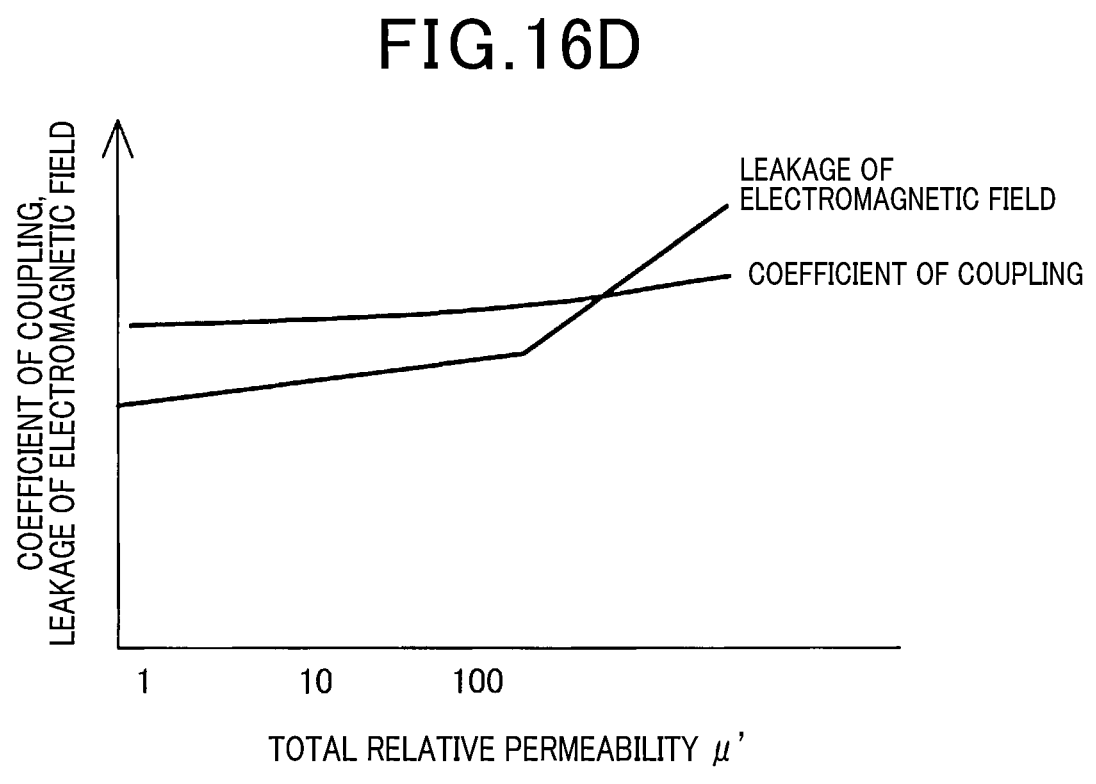

LEAKAGE OF
ELECTROMAGNETIC FIELD

COEFFICIENT OF COUPLING

COEFFICIENT OF COUPLING,
LEAKAGE OF ELECTROMAGNETIC FIELD 1        10        100

TOTAL RELATIVE PERMEABILITY $\mu'$

| | AMPLITUDE | PHASE (°) |
|---|---|---|
| I1 | A1 | 90 |
| I2 | A1 | 90 |
| Ia | A2 | 0 |
| Ib | A2 | −180 |

PHASE OF CURRENT IN CANCELLER COIL (PHASE DIFFERENT FROM Ia)

PHASE OF CURRENT IN CANCELLER COIL (PHASE DIFFERENT FROM Ia)

CURRENT RELATION RESULTING FROM THE ABOVE LOCATIONAL RELATION

|  | AMPLITUDE | PHASE (°) |
|---|---|---|
| I1 | A1 | 120 |
| I2 | A1 | 120 |
| Ia | A2 | 0 |
| Ib | A2 | −130 |

PHASE OF CURRENT IN CANCELLER COIL (PHASE DIFFERENT FROM Ia)

PHASE OF CURRENT IN CANCELLER COIL (PHASE DIFFERENT FROM Ia)

1

CONTACTLESS POWER FEEDING APPARATUS AND CONTACTLESS POWER FEEDING SYSTEM

CROSS REFERENCE TO RELATED DOCUMENTS

The present application is a divisional of U.S. application Ser. No. 17/150,351, filed Jan. 15, 2021, which claims the benefit of priority of Japanese Patent Application No. 2018-135060 filed on Jul. 18, 2018 and Japanese Patent Application No. 2019-038160 filed on Mar. 4, 2019, the disclosures of which are incorporated herein by reference.

TECHNICAL FIELD

This disclosure generally relates to a technique for feeding electrical power to a vehicle in a contactless mode during traveling of the vehicle.

BACKGROUND ART

Japanese Patent First Publication No. 2014-110726A discloses a technique for feeding electrical power to a vehicle in a contactless mode. This prior art technique reduces a leakage of magnetic flux using canceller coils. The canceller coils are disposed behind a power feeding coil and a power receiving coil.

SUMMARY OF THE INVENTION

The above prior art technique is required to have the canceller coils in addition to the power feeding coil, thus resulting in undesirable increases in size and production cost of the apparatus. The above prior art technique relates to power feeding when a vehicle is stopped and thus faces a problem that it cannot be used for feeding the power to the vehicle when traveling. A technique for reducing leakage of power when the power is supplied to a traveling vehicle in the contactless mode is, therefore, sought.

According to one aspect of this disclosure, there is provided a contactless power feeding apparatus which feeds electrical power to a traveling vehicle in a contactless mode. The contactless power feeding apparatus comprises a plurality of primary coils which are mounted on a road, and a power feed controller which uses one(s) of the primary coils as a power transmitting coil to achieve delivery of electrical power from the power transmitting coil to a secondary coil installed in the vehicle. The power feed controller works to use a selected primary coil(s) that is one(s) of the primary coils other than the power transmitting coil to reduce a leakage of magnetic flux resulting from excitation of the power transmitting coil.

The contactless power feeding apparatus is capable of reduce the leakage of magnetic flux without any need for an additional canceller coil in addition to the primary coils.

According to another aspect of this disclosure, there is provided a contactless power feeding system which uses a plurality of primary coils mounted on a road and a secondary coil installed in a vehicle to feed electrical power to the vehicle in a contactless mode during traveling of the vehicle. The contactless power feeding system comprises a power feed controller which uses one(s) of the primary coils as a power transmitting coil to achieve feeding of the electrical power from the power transmitting coil, and a control device which controls an operation of the secondary coil. The contactless power feeding system executes at least one of a first operation and a second operation. The first operation is performed by the power feed controller to use one(s) of the primary coils other than the power transmitting coil to reduce a leakage of magnetic flux arising from excitation of the power transmitting coil. The second operation is performed by the control device to create a flow of electrical current through the secondary coil when the secondary coil is not receiving the electrical power to reduce the leakage of magnetic flux arising from the excitation of the power transmitting coil.

The contactless power feeding apparatus is capable of reducing the leakage of magnetic flux without need for a canceller coil in addition the primary coils.

BRIEF DESCRIPTION OF THE DRAWINGS

FIG. 16D is a graph which represents a relation among a total relative permeability of magnetic yokes, a coefficient of coupling of the magnetic yokes, and leakage of electromagnetic field.

FIG. 19 is an explanatory view which canceller coils in use where a circuit structure which has power feeding circuits each of which excites a corresponding one of DD coils of primary coils.

FIG. 20 is an explanatory view which canceller coils in use where a circuit structure is employed which has power feeding circuits two of which excite a corresponding one of DD coils of primary coils.

FIG. 21 is an explanatory view which illustrates an example where one of coils of the DD coil illustrated in FIG. 20 is omitted.

EMBODIMENTS FOR CARRYING OUT THE INVENTION

A. First Embodiment

Figure 1:
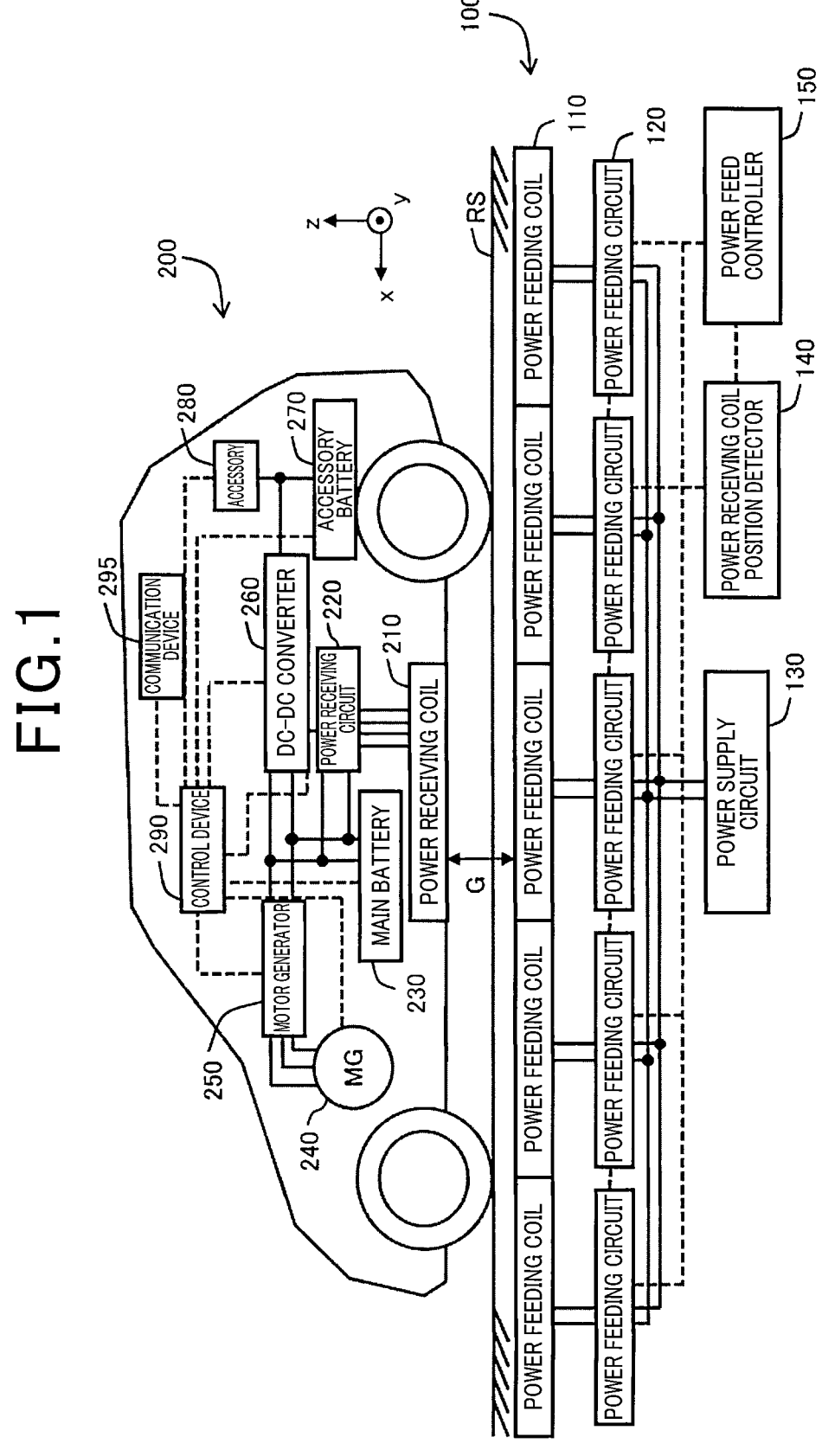
FIG. 1 is a block diagram which illustrates an entire structure of a during-traveling contactless power feeding system.

A during-traveling contactless power feeding system, as illustrated in FIG. 1, includes the contactless power feeding apparatus 100 installed on the road RS and the vehicle 200 traveling on the road RS and is capable of feeding electrical power from the contactless power feeding apparatus 100 to the vehicle 200 in a contactless mode during traveling of the vehicle 200. The vehicle 200 is implemented by, for example, an electric vehicle or a hybrid vehicle. In FIG. 1, the x-direction represents a direction in which the vehicle 200 is heading (which will also be referred to as a traveling direction). The y-direction represents a width-wise direction of the vehicle 200. The z-direction represents an upward vertical direction. The same applies to the other drawings.

The contactless power feeding apparatus 100 includes a plurality of power feeding coils 110, a plurality of power feeding circuits 120 which supply ac voltage to the respective power feeding coils 110, the power supply circuit 130 which delivers the dc voltage to the power feeding circuits 120, the power receiving coil position detector 140, and the power feed controller 150 which controls power feeding.

The power feeding coils 110 are arrayed along the traveling direction on the road RS. Each of the power feeding coils 110 includes a primary coil which will also be referred to as a power feeding coil. The structure of the power feeding coils 110 will be described later in detail. The primary coils need not be designed as the power feeding coils 110 as long as they are arranged in the traveling direction on the road RS.

The power feeding circuits 120 are designed as inverter circuits which work to convert dc voltage, as delivered from the power supply circuit 130, into a high-frequency ac voltage and apply it to primary coils of the power feeding coils 110. The power supply circuit 130 works to deliver dc voltage to the power feeding circuits 120. For instance, the power supply circuit 130 is made of an AC/DC converter which rectifies ac voltage, as produced by an external power supply, into dc voltage and output it. The dc voltage outputted by the power supply circuit 130 needs not be a completely dc voltage, but may contain a certain degree of variation (i.e., ripple).

The power receiving coil position detector 140 determines the position of the power receiving coil 210 mounted in the vehicle 200 along the x-direction. For instance, the power receiving coil position detector 140 is designed to determine the position of the power receiving coil 210 as a function of the magnitude of electrical power or electrical current delivered by the power feeding circuits 120 or using radio communication with the vehicle 200 or a sensor serving to measure the position of the vehicle 200. The power feeding circuits 120 are responsive to the position of the power receiving coil 210, as measured by the power receiving coil position detector 140, to achieve feeding of electrical power using one or more of the power feeding coils 110 which are arranged close to the power receiving coil 210. The primary coils installed in the power feeding coils 110 which achieve the power feeding will also be referred to as power transmitting coils.

The vehicle 200 is equipped with the power receiving coil 210, the power receiving circuit 220, the main battery 230, the motor generator 240, the inverter circuit 250, the DC-DC converter circuit 260, the accessory battery 270, the accessory 280, the control device 290, and the communication device 295.

The power receiving coil 210 includes a secondary coil and is designed as a device working to generate induced electromotive force by electromagnetic induction between itself and the primary coils of the power feeding coils 110. The secondary coil will also be referred to as a power receiving coil. The power receiving circuit 220 is designed as a circuit working to convert ac voltage, as outputted from the power receiving coil 210, into dc voltage suitable for charging the main battery 230. For instance, the power receiving circuit 220 is designed to include a rectifier which converts ac voltage to dc voltage and a DC-DC converter which steps up the dc voltage. The ac voltage, as outputted from the power receiving circuit 220, may be used to charge the main battery 230 and also used to charge the accessory battery 270, drive the motor generator 240, and activate the accessory 280.

The main battery 230 is made of a secondary battery which outputs a high dc voltage to actuate the motor generator 240. The motor generator 240 works as a three-phase ac motor to generate power to drive the vehicle 200. The motor generator 240 serves as a generator when the vehicle 200 is decelerating to generate three-phase ac voltage. When the motor generator 240 operates in a motor mode, the inverter circuit 250 converts dc voltage, as produced by the main battery 230, into three-phase ac voltage and delivers it to the motor generator 240. Alternatively, when the motor generator 240 operates in a generator mode, the inverter circuit 250 converts three-phase ac voltage, as outputted from the motor generator 240, into dc voltage and supplies it to the main battery 230.

The DC-DC converter circuit 260 changes dc voltage, as produced by the main battery 230, into a lower dc voltage and delivers it to the accessory battery 270 and the accessory 280. The accessory battery 270 is made of a secondary battery which outputs a relatively low dc voltage for use in operating the accessory 280. The accessory 280 is implemented by a peripheral device, such as an air conditioner or an electrical power steering device.

The control device 290 works to control parts installed in the vehicle 200. When receiving electrical power in the contactless mode during traveling of the vehicle 200, the control device 290 controls an operation of the power receiving circuit 220 to achieve power reception. The communication device 295 is engineered as a wireless communication device which achieves vehicle-to-vehicle communications or road-to-vehicle communications. For instance, the communication device 295 is capable of communicating with the power receiving coil position detector 140 in a road-to-vehicle communication mode.

The power receiving coil position detector 140 of the contactless power feeding apparatus 100 is preferably designed to measure a gap G between the primary coil of the power feeding coil 110 and the secondary coil of the power receiving coil 210 as representing the position of the power receiving coil 210. For instance, the power receiving coil position detector 140 may be designed to wirelessly communicate with the vehicle 200 to obtain information about a height between the road surface and the secondary coil of the power receiving coil 210 and calculate the gap G between the primary coil of the power feeding coils 110 and the secondary coil of the power receiving coil 210 using the height information. The gap G between the primary coil and the secondary coil indicates a distance between the primary coil and the secondary coil in a vertical direction (i.e., the z-direction).

Figure 2:
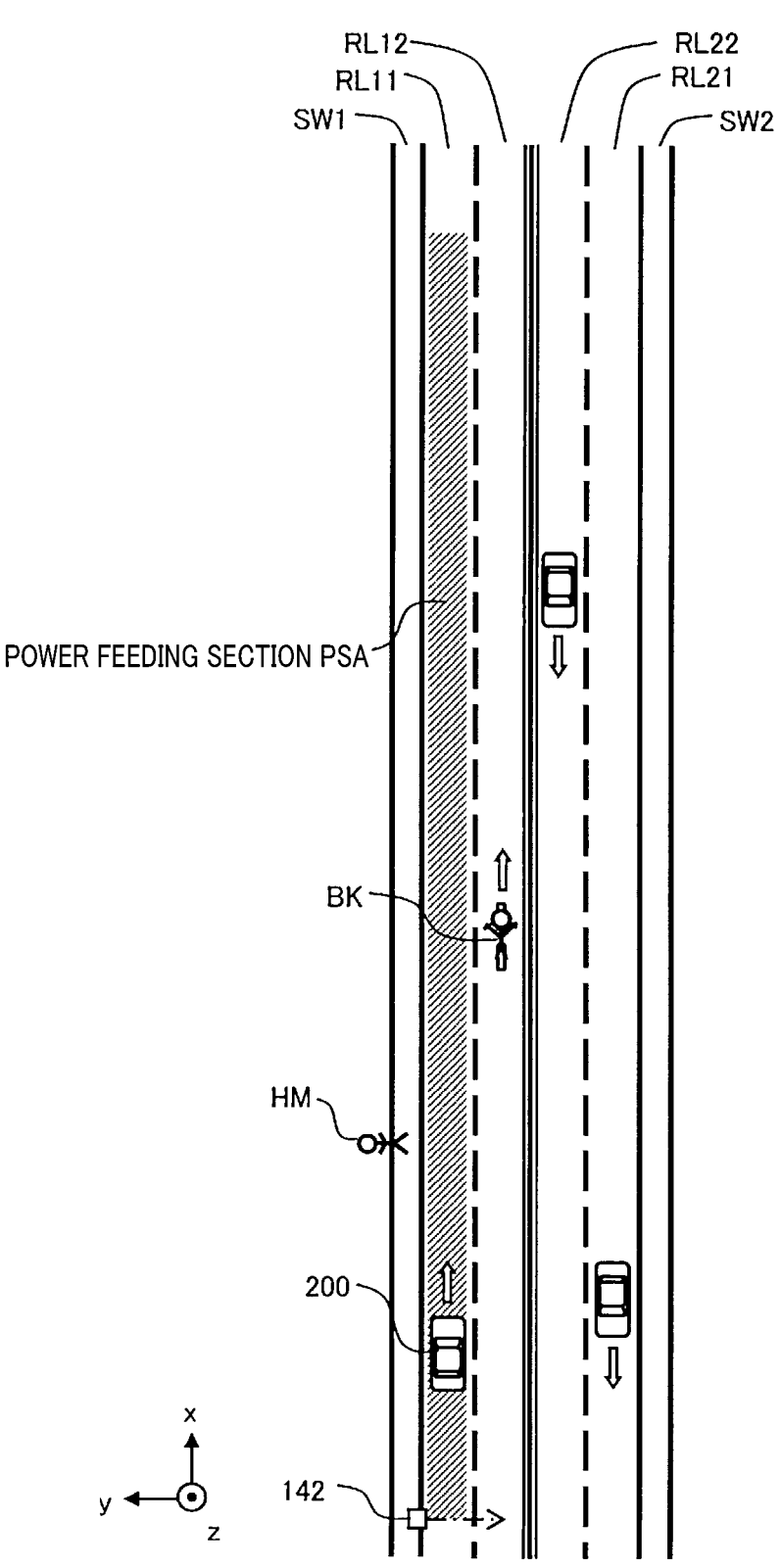
FIG. 2 is an explanatory view which illustrates a power feeding section arranged on a traffic lane.

The following discussion will assume that a road, as demonstrated in FIG. 2, has two traffic lanes RL11 and RL12 and two oncoming traffic lane RL21 and RL22, and the power feeding section PSA is provided in the traffic lane RL11 where the vehicle 200 is traveling. The power feeding section PSA has installed therein the contactless power feeding apparatus 100 which has been described in FIG. 1. The sidewalk SW1 exists outside the traffic lanes RL11 and RL2. Similarly, the sidewalk SW2 exists outside the oncoming traffic lanes RL21 and RL22. The pedestrian HM exists in the sidewalk SW1. The two-wheel vehicle BK is moving in the traffic lane RL12 next to the vehicle 200.

In the example demonstrated in FIG. 2, the contactless sensor 142 which uses infrared light is installed in an entrance of the power feeding section PSA. The contactless sensor 142 detects the vehicle 200 entering the power feeding section PSA. The power receiving coil position detector 140 is capable of using an output from the contactless sensor 142 and the speed of the vehicle 200 obtained through the road-to-vehicle communications to determine the positions of the vehicle 200 and the power receiving coil 210.

Figure 3:
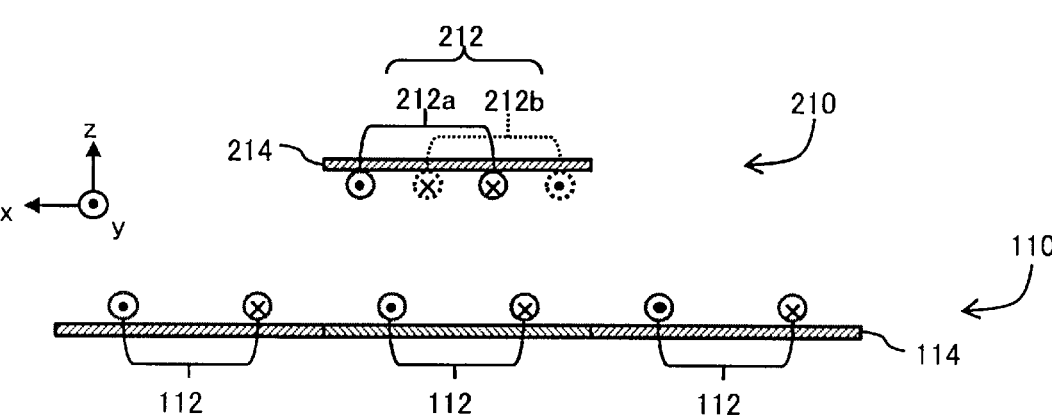
FIG. 3 is an explanatory view which illustrates examples of coil structures of a primary coil and a secondary coil.

The power feeding coil 110, as illustrated in FIG. 3, includes the primary coils 112 and the magnetic yokes 114. The power receiving coil 210 includes the secondary coil 212 and the magnetic yoke 214. The primary coil 112 is made of a single-phase coil. The secondary coil 212 is designed as a two-phase coil including the A-phase coil 212a and the B-phase coil 212b. Each of the coils 112, 212a, and 212b is engineered as a concentrated winding having two or more turns and illustrated in a simplified form in FIG. 3. Circles represent coil wires of the coils 112, 212a, and 212b. "·" and "×" in the circles represent directions of flow of electrical current which are opposite each other. The primary coil 112 may alternatively be designed as a multiphase coil, such as two or more phase coil. The secondary coil 212 may alternatively be made of a single-phase coil or a three-phase coil.

The magnetic yokes 114 and 214 serve as back yoke and are used to enhance the density of magnetic flux around the coils 112 and 212. The magnetic yoke 114 of the power feeding coils 110 is arranged behind the primary coil 112. "behind the primary coil 112" represents an opposite side of the primary coil 112 to a gap between itself and the primary coil 112. Similarly, the magnetic yoke 214 of the power receiving coil 210 is arranged behind the secondary coil 212. A magnetic core may be installed in each of the primary coil 112 and the secondary coil 212 in addition to the magnetic yokes 114 and 214. A magnetic shield made of a non-magnetic metal may also be arranged behind each of the magnetic yokes 114 and 214.

The frequency of ac voltage applied to the primary coil 112 is selected to high enough to view the secondary coil 212 as being substantially stationary in terms of delivery of electrical power from the primary coil 112 to the secondary coil 212 although the vehicle 200 is traveling. If the secondary coil 212 is moving at a constant speed in the x-direction in FIG. 3, the frequency $f_{212}$ of movement of the secondary coil 212 is given by $$f_{212} = 1/\{p_{112}/v_{212}\}$$

where $p_{112}$ represents a pitch or interval [m] between the primary coils 112, $v_{212}$ represents a speed [m/s] at which the secondary coil 212 moves. The moving frequency $f_{212}$ is thought of as being a frequency at which the secondary coil 212 travels along an array of the primary coils 112. For instance, if the moving frequency $f_{212}$ of the secondary coil 212 in a during-traveling contactless power feeding mode is between several tens Hz and several hundreds Hz, the frequency of ac voltage applied to the primary coils 112 is set to a value in a range of several tens kHz to several hundreds kHz. The selection of the frequency of ac voltage applied to the primary coil 112 to be much higher than the moving frequency $f_{212}$ of the secondary coil 212 in the above way causes the secondary coil 212 to appear as being substantially stationary in terms of delivery of electrical power from the primary coils 112 to the secondary coil 212 although the vehicle 200 is traveling.

Figure 4:
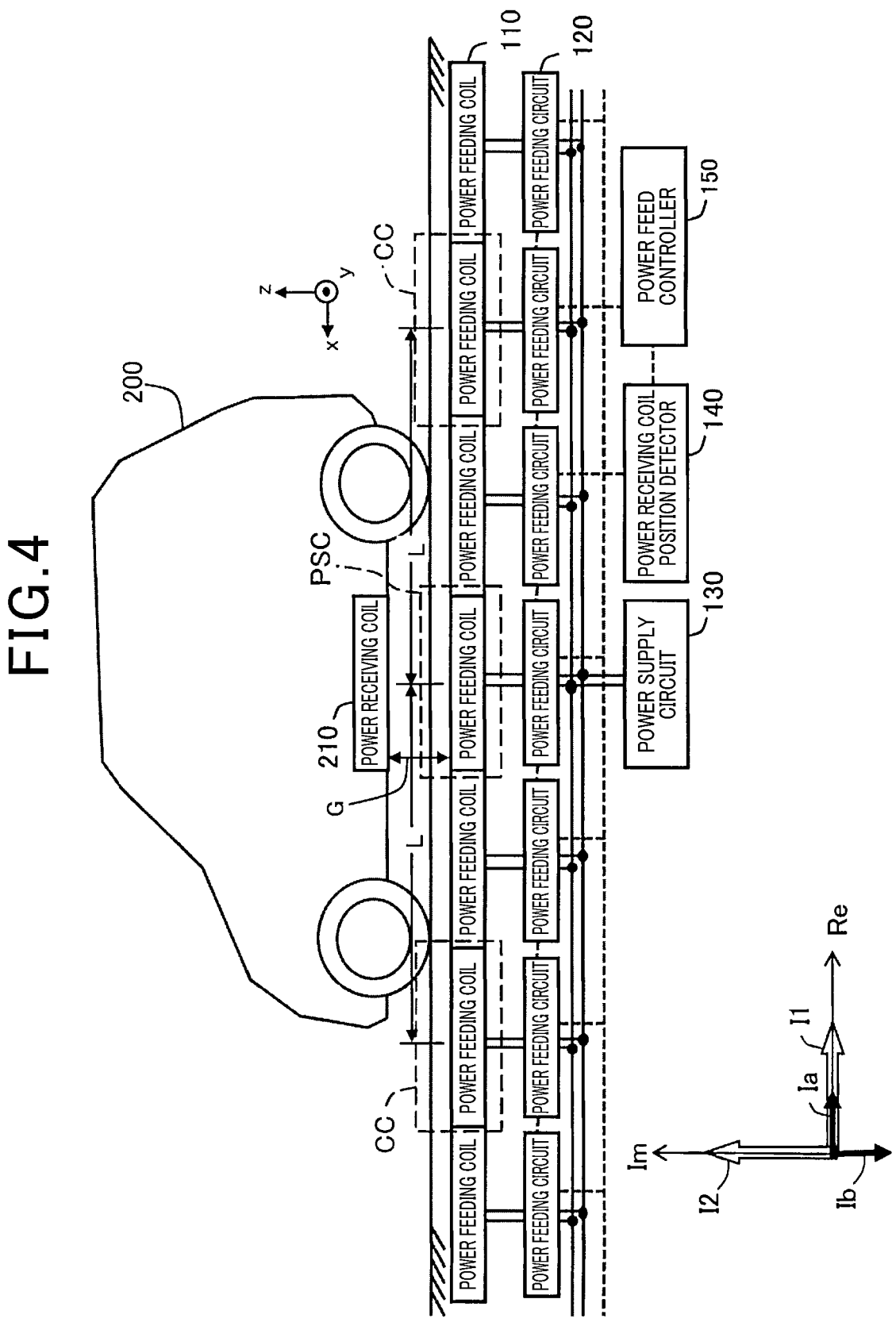
FIG. 4 is an explanatory view which shows power transmitting coils and canceller coils in the first embodiment.

In the first embodiment, the primary coil 112 of the power feeding coil 110 which, as demonstrated in FIG. 4, lies directly beneath the power receiving coil 210 serve as a power transmitting coil PSC which achieves transmission or delivery of electrical power to the power receiving coil 210. The primary coils of two of the power feeding coils 110 which are located at a distance L away from the power transmitting coil PSC in front and back of the power receiving coil 210 in the x-direction serve as canceller coils CC. The canceller coils CC are used to reduce a leakage of magnetic flux arising from energization of the power transmitting coil PSC. The distance L between the two primary coils 112 is an interval between centers of those primary coils 112. The determination of the distance L will be described later in detail.

Figure 5:
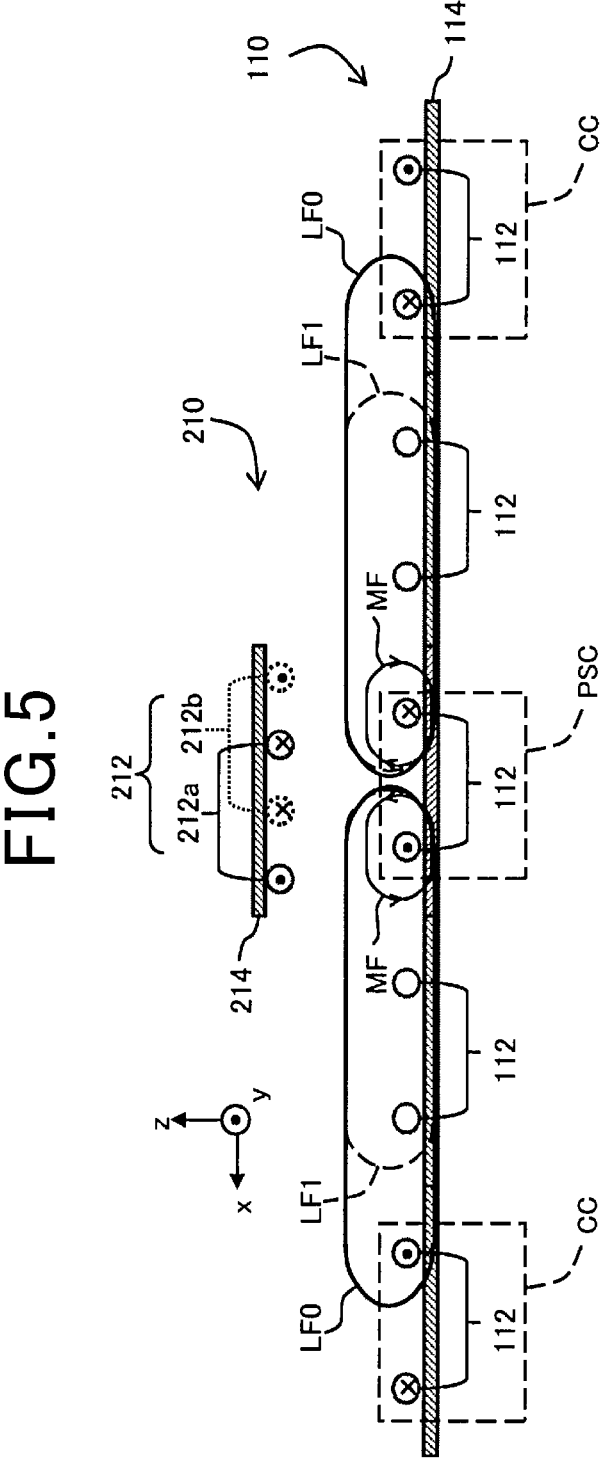
FIG. 5 is an explanatory view which illustrates a decrease in leakage of magnetic flux by a canceller coil.

In the first embodiment, the reduction in leakage of magnetic flux is, as illustrated in FIG. 5, achieved by short-circuiting ends of the canceller coils CC. FIG. 5 demonstrates main magnetic fluxes MF and magnetic flux leakages LFO occurring when only the power transmitting coil PSC is energized without energizing the other primary coils 112. Short-circuits of the canceller coils CC will cause the canceller coils CC to generate electromotive force by the magnetic flux leakages LFO, which creates flows of electrical current in the canceller coils CC, thereby producing magnetic fluxes flowing in directions opposite the magnetic flux leakages LFO. This results in a reduction in magnetic flux leakage near the canceller coils CC. LF1 indicates magnetic flux leakages after reduced. The reduction in magnetic flux leakage will minimize errors in operation of electronic devices or communication devices and also alleviate a risk of exposure of human body to the magnetic flux. The short-circuits of the canceller coils CC may be achieved using a circuit structure as will be described below.

Figure 6A:
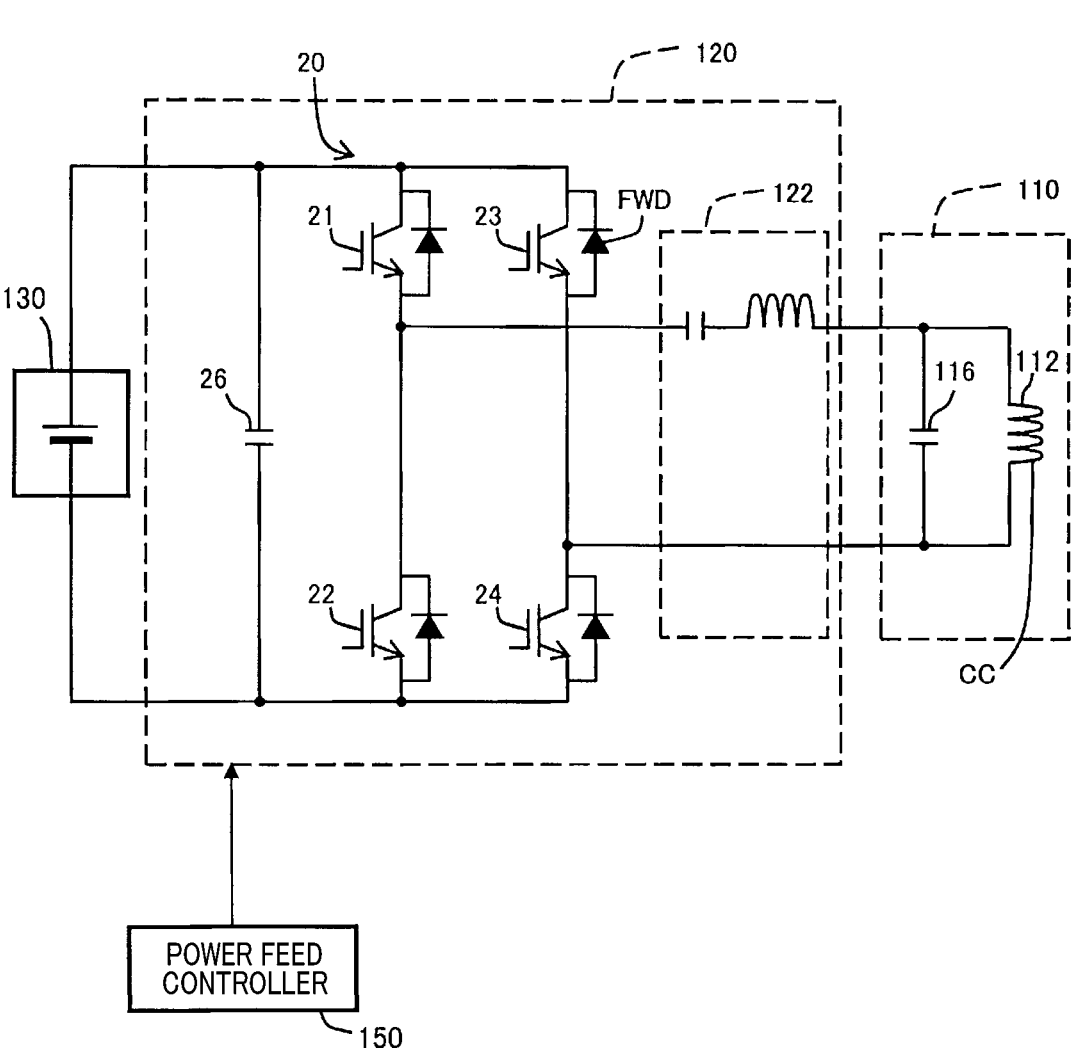
FIG. 6A is an explanatory view which illustrates an example of a circuit structure of a power feeding circuit and a power feeding coil.

Each of the power feeding circuits 120 is, as clearly illustrated in FIG. 6A, connected to the power supply circuit 130 to receive dc voltage from the power supply circuit 130. The power feeding circuit 120 includes an inverter circuit made up of the full-bridge circuit 20 and the capacitor 26. The full bridge circuit 20 is made of four switches 21, 22, 23, and 24. The capacitor 26 may be omitted. In this example, the switches 21 to 24 are each made of a transistor with a freewheeling diode connected parallel thereto. The power feed controller 150 output switching signals to the switches 21 to 24. The primary coil 112 is connected to two output terminals of the full bridge circuit 20 through the band-pass filter 122. The resonant capacitor 116 is connected to the primary coil 112 in parallel thereto. The resonant capacitor 116 may alternatively be connected in series with the primary coil 112. The band-pass filter 122 may be omitted. A high-pass filter or a low-pass filter may also be used instead of the band-pass filter 122. In the circuit structure in FIG. 6A, when the primary coil 112 is used as the canceller coil CC, a short-circuit of the ends of the primary coil 112 serving as the canceller coil CC may be achieved by turning on both the upper arm switches 21 and 23 or both the lower arm switches 22 and 24. In FIG. 6A, the resonant capacitor 116 is connected parallel to the primary coil 112 to form a resonator, so that the whole of the resonator is short-circuited.

Figure 6B:
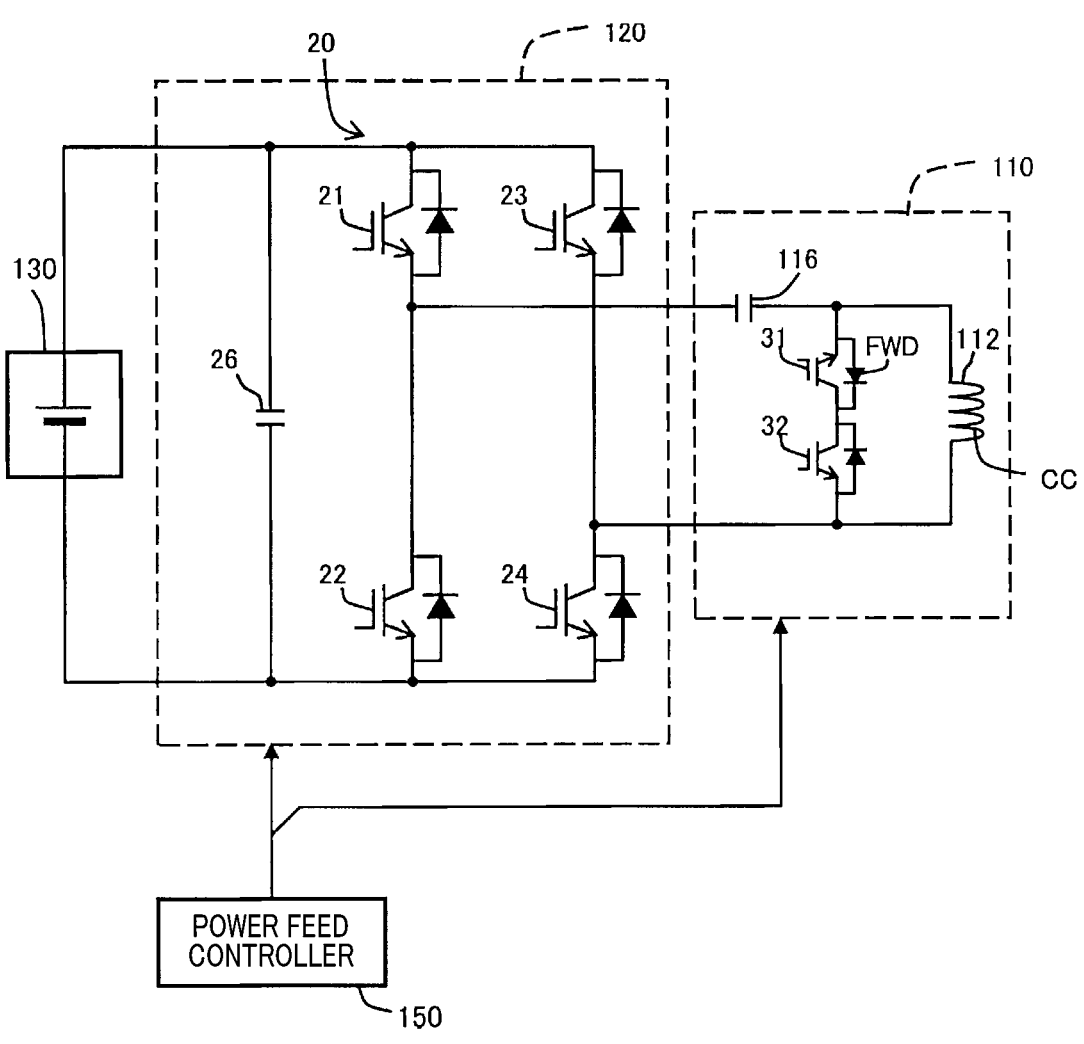
FIG. 6B is an explanatory view which shows an example of a circuit structure of a power feeding circuit and a power feeding coil.

The power feeding coil 110 may alternatively be, as illustrated in FIG. 6B, equipped with the short-circuit switches 31 and 32. In this example, each of the short-circuit switches 31 and 32 is made of a transistor with a freewheeling diode connected parallel thereto. The short-circuit switches 31 and 32 are oppositely oriented and connected together. The short-circuit switches 31 and 32 which are connected in series with each other are connected to the primary coil 112 in parallel thereto. The power feed controller 150 delivers switching signals to the short-circuit switches 31 and 32. The short-circuit of the ends of the primary coil 112 serving as the canceller coil CC is achieved is achieved by simultaneously turning on the short-circuit switches 31 and 32. In FIG. 6B, the resonant capacitor 116 is connected in series with the primary coil 112, but may alternatively be connected in parallel to the primary coil 112. The series connection of the resonant capacitor 116 to the primary coil 112 in FIG. 6B will result, unlike the structure in FIG. 6A, in a short-circuit of only the primary coil 112 without creating a short-circuit of a resonant circuit developed by the short-circuit switches 31 and 32. The circuit in FIG. 6B may have a filter circuit disposed upstream of the power feeding coil 110. In this example, the short-circuit switches 31 and 32 may be arranged between the filter circuit and the full bridge circuit 20 to achieve the same effect as that provided by short-circuiting the coil 112.

FIG. 4 demonstrates a phase relation among the electrical currents I1, I2, Ia, and Ib on a complex number plane with a rear axis Re and an imaginary axis Im. The effect of reducing a magnetic flux leakage derived by short-circuiting the canceller coil CC will be described below using the currents I1, I2, Ia, and Ib. When the current I1 flows to the primary coil, it results in transmission of electrical power, thereby causing the current I2 which is 90° away from the current I1 to flow to the secondary side due to an effect of the capacitor. Operations where only the canceller coil CC is short-circuited without the capacitor and where the canceller coils CC is short-circuit with the capacitor will be described below. The short-circuit of the canceller coil CC without the capacitor will cause the current Ia to be produced in the canceller coil CC in phase with the current I1 on the primary side. This is because an induced electrical current flows to reduce a change in magnetic flux interlinking with the canceller coil CC. The current Ia flows in the canceller coil CC without any change in magnetic flux, thus resulting in a reduction in magnetic flux leakage. Alternatively, the short-circuit of the canceller coil CC with the capacitor will cause the current Ib to flow in opposite phase to the current I2 on the secondary side. This is because the capacitor will work to create a 90° phase shift from when only the canceller coil CC is short-circuited. In other words, the current Ib flows 180° out of phase with the current I2 on the secondary side, thereby reducing the magnetic flux leakage.

Figure 7:
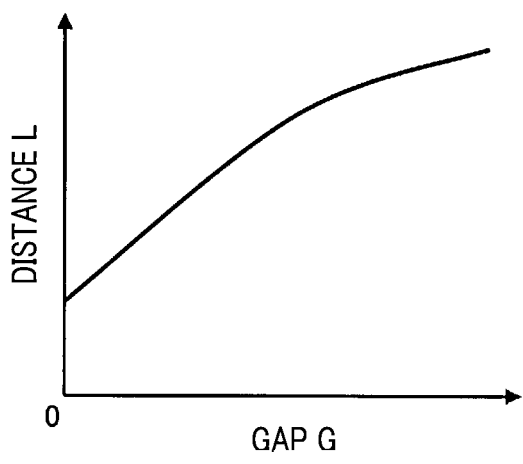
FIG. 7 is a graph which represents an example of a relation between a gap G between a primary coil and a secondary coil and a distance L between a power transmitting coil and a canceller coil.

The distance L between the power transmitting coil PSC and the canceller coils CC is, as can be seen in FIG. 7, preferably determined to increase with an increase in interval or gap G (see FIG. 4) between the power transmitting coil PSC and the secondary coil 212. This is because when the gap G is small, and the primary coil 112 near the power transmitting coil PSC is used as the canceller coil CC, it may cause the canceller coil CC to reduce the main magnetic flux MF, thereby resulting in a decrease in efficiency. The relation shown in FIG. 7 may be used in other embodiments described later. The distance L may alternatively be determined to be constant regardless of the gap G. In this case, the distance L is selected experimentally.

In a case where the pedestrian HM or the two-wheel vehicle BK, as demonstrated in FIG. 2, exists near the vehicle 200 receiving electrical power, it is advisable that the primary coils 112 which are located adjacent the pedestrian HM or the two-wheel vehicle BK in the y-direction be not used as the canceller coils CC. This is because the use of the primary coils 112 lateral to the pedestrian HM or the two-wheel vehicle BK as the canceller coils CC will result in a change in magnetic field therearound which may adversely affect the pedestrian HM or a driver of the two-wheel vehicle BK. The contactless power feeding apparatus 100 may obtain an output of a peripheral sensor, such as a camera or a radar, installed in the vehicle through the road-to-vehicle communications to derive the position of the pedestrian HM or the two-wheel vehicle BK.

As described above, in the first embodiment, the power feed controller 150 uses the canceller coil(s) CC serving as a selected primary coil(s) that is one(s) of the primary coils 112 and discrete from the power transmitting coil PSC to decrease the leakage of magnetic flux caused by energization of the power transmitting coil PSC. This eliminates the need for a canceller coil(s) in addition to the primary coils 112 in order to reduce the leakage of the magnetic flux. The first embodiment is designed to short-circuit the ends of the canceller coil(s) CC to reduce the leakage of the magnetic flux, thereby eliminating the need for an excess flow of electrical current in the canceller coil(s) CC.

B. Second Embodiment

Figure 8:
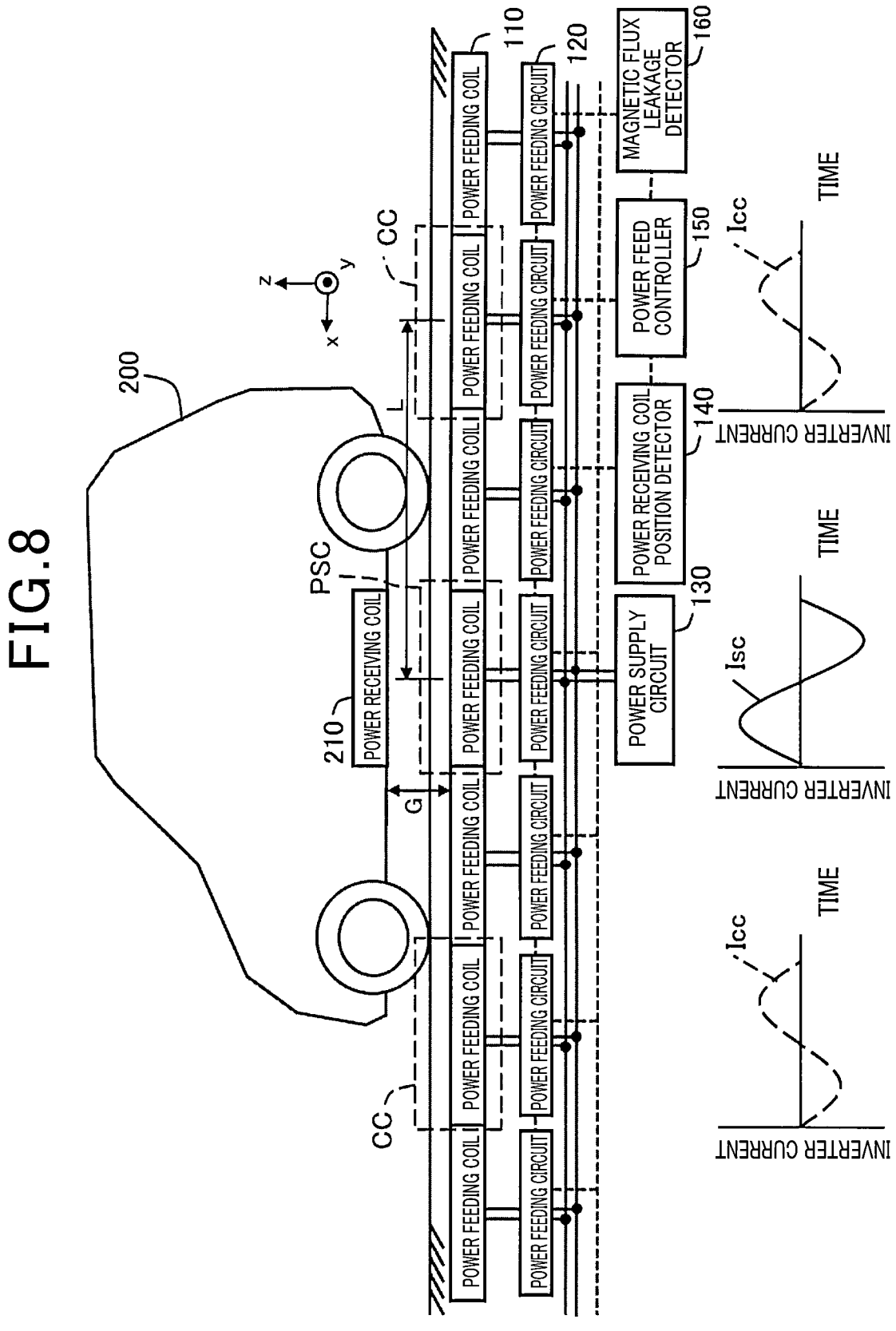
FIG. 8 is an explanatory view which illustrates power transmitting coils and canceller coils in the second embodiment.

The second embodiment is, as illustrated in FIG. 8, designed to have the contactless power feeding apparatus 100 equipped with the magnetic flux leakage detector 160 which detect a magnetic flux leakage from each of the power feeding coils 110. The primary coil 112 of one(s) of the power feeding coils 110 which is undergoing a large amount of leakage of magnetic flux measured by the magnetic flux leakage detector 160 is used as the canceller coil CC. In the second embodiment, a flow of cancel current Icc is provided by the power feeding circuit 120 to the canceller coil CC to reduce the magnetic flux leakage. The phase of the cancel current Icc flowing in the canceller coil CC is selected to reduce the magnetic flux leakage. Specifically, in the example in FIG. 8, the phase of the cancel current Icc is selected to be 180° out of phase from that of the power feeding current Isc flowing to the power transmitting coil PSC.

Figure 9:
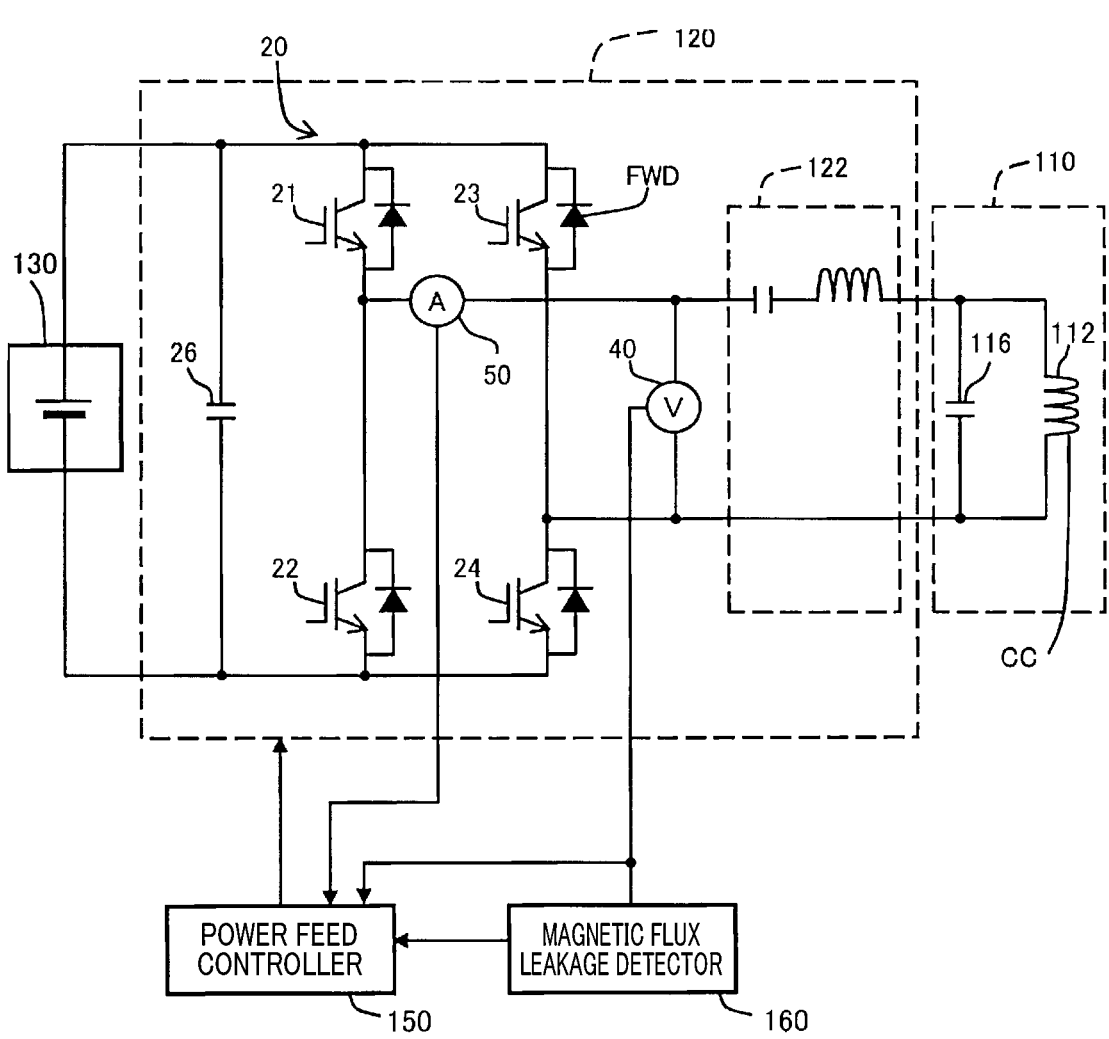
FIG. 9 is an explanatory view which illustrates examples of circuit structures of a power feeding circuit and a power feeding coil in the second embodiment.

The cancel current Icc flowing to the canceller coil CC is, as illustrated in FIG. 9, regulated as a function of a magnetic flux leakage measured by the magnetic flux leakage detector 160. The power feeding circuit 120 is equipped with the voltage sensor 40 which measures the voltage developed at the primary coil 112 and the current sensor 50 which measures an output current from the inverter circuit. The voltage is created at the primary coil 112 depending upon the magnetic flux leakage. The magnetic flux leakage detector 160 determines a magnetic flux leakage, as occurring at a location of the primary coil 112, using the voltage measured by the voltage sensor 40. The power feed controller 150 applies voltage to the canceller coil CC using the power feeding circuit 120 to generate the cancel current Icc which reduces the magnetic flux leakage. Usually, the cancel current Icc is preferably selected to be lower than the power feeding current Isc, thereby achieving a reduction in magnetic flux leakage using a small amount of electrical current flowing through the canceller coil CC.

The use of the magnetic flux leakage detector 160 to detect the magnetic flux leakage enables a direction and/or an amount of the cancel current Icc in the canceller coils CC to be adjusted to one required to achieve the reduction in magnetic flux leakage. The adjustment of the cancel current Icc may be achieved in an optional control mode, such as a feedback mode or a feedforward mode. A target (i.e., a target controlled coil) whose magnetic flux leakage should be reduced by controlling the current in the canceller coil CC may be the canceller coil CC itself or the primary coil 112 other than the canceller coils CC.

Figure 10:
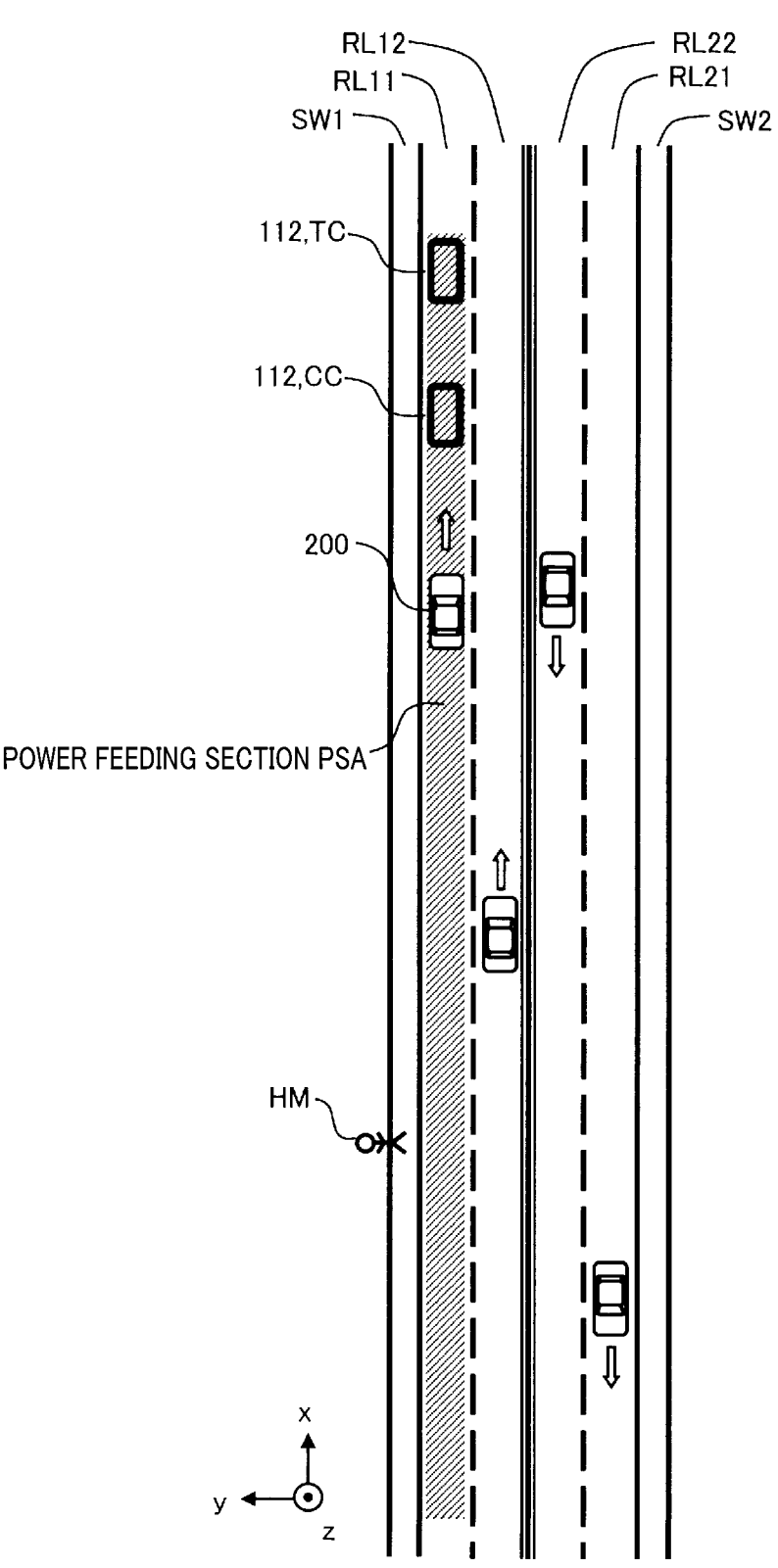
FIG. 10 is an explanatory view which illustrates an example of a target controlled coil in the second embodiment.

In the example demonstrated in FIG. 10, the target controlled coil TC is set to the primary coil 112 which is located at a selected position (i.e., an end) of the power feeding section PSA. FIG. 10 omits the primary coils 112 other than the target controlled coil TC and the canceller coil CC. In the example in FIG. 10, the amount of leakage of magnetic flux from the target controlled coil TC is reduced by controlling the current flowing in the canceller coil CC. The target controlled coil TC may be preselected in light of surroundings. In use of such a target controlled coil TC, an amount of electrical current flowing in the canceller coil CC may be controlled as a function of a leakage of magnetic flux (i.e., the magnetic flux leakage) from the target controlled coil TC. The voltage induced by the target controlled coil TC may be used as a parameter indicating the magnetic flux leakage. The induced voltage at the target controlled coil TC resulting from the magnetic flux leakage may be, as discussed in FIG. 9, measured by the voltage sensor 40. A target level of the induced voltage may be set to 0V or a permissible level around 0V.

In the second embodiment as described above, the power feed controller 150 is designed to control a circuit device connected to the canceller coil CC to create a flow of electrical current in the canceller coil CC for reducing the magnetic flux leakage. The second embodiment selects the canceller coil CC and regulate an amount and a phase of the cancel current as a function of the magnetic flux leakage measured by the magnetic flux leakage detector 160, but however, may be designed not to have the magnetic flux leakage detector 160. In this case, the primary coil 112 arranged at the predetermined distance L away from the power transmitting coil PSC may be selected as the canceller coil CC. The amount and phase of the cancel current Icc may also be set to predetermined values.

C. Third Embodiment

Figure 11:
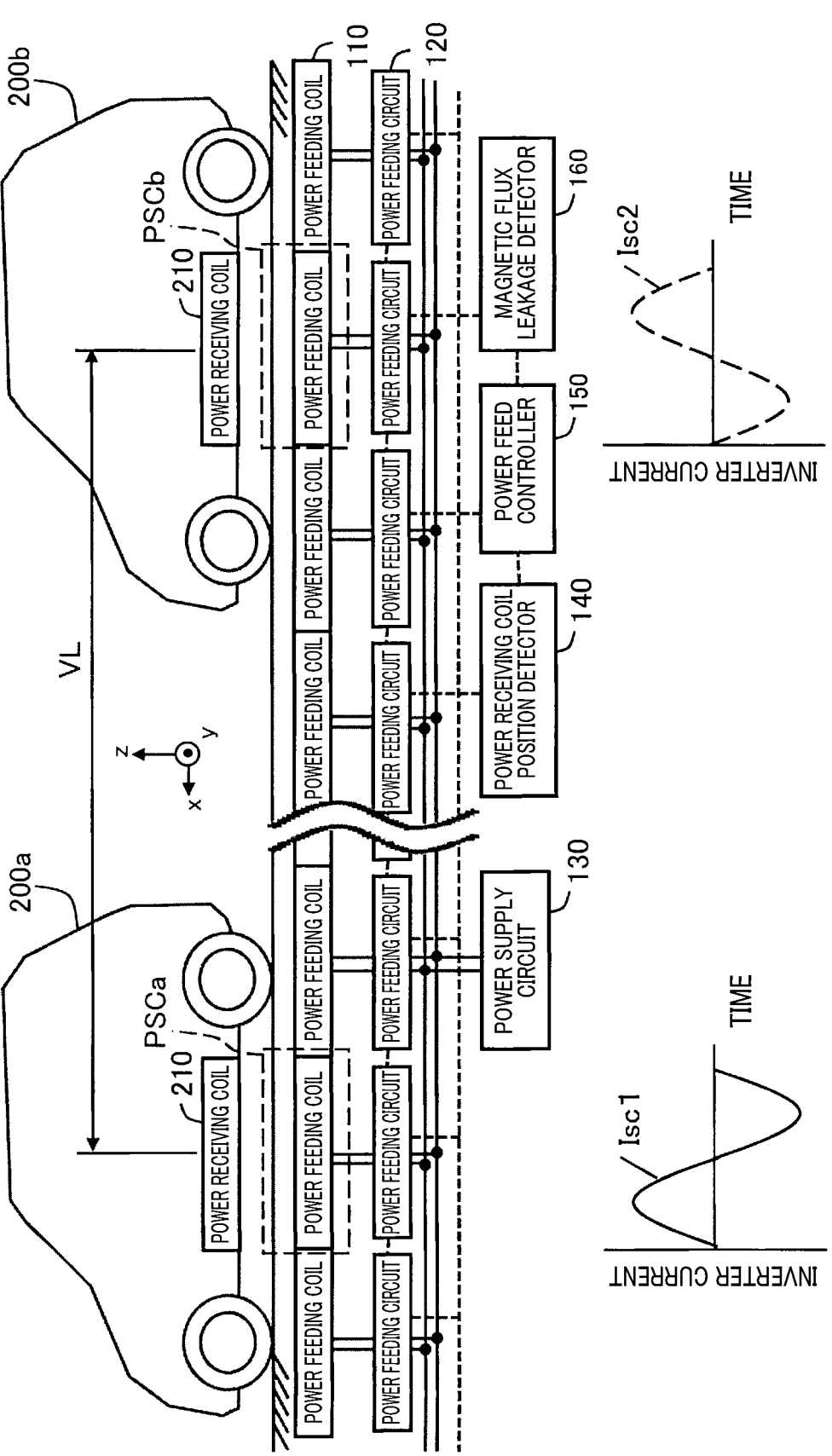
FIG. 11 is an explanatory view which illustrates power transmitting coils and canceller coils in the third embodiment.

The third embodiment is, as illustrated in FIG. 11, designed for a case where two vehicles 200a and 200b are traveling on the same lane. In this example, the first power feeding current Isc1 flows in the power transmitting coil PSCa which delivers electrical power to the first vehicle 200a. The second power feeding current Isc2 flows in the power transmitting coil PSCb which delivers electrical power to the second vehicle 200b. In the third embodiment, the phase of the second power feeding current Isc2 is controlled to reduce the magnetic flux leakage from the first power feeding current Isc1. In the example demonstrated in FIG. 11, the second power feeding current Isc2 is selected to be 180° out of phase from the first power feeding current Isc1.

There may be, however, a case where the power feeding currents Isc1 and Isc2 are preferably selected in phase with each other in terms of reduction in magnetic flux leakage. For instance, it is assumed that the primary coils 112 are arrayed in the x-direction, and a respective adjacent two of the primary coils 112 are opposite in winding direction to each other. The two power transmitting coils PSCa and PSCb may be opposite in winding direction to each other depending upon the distance VL between the vehicles 200a and 200b. In such a case, it is advisable that the power feeding current Isc1 and Isc2 for the power transmitting coil PSCa and PSCb be selected to be in phase with each other in terms of the reduction in magnetic flux leakage. A locational relation between the power receiving coils 210 of the vehicle 200*a* and 200*b* may be derived using an output from the power receiving coil position detector 140.

When the vehicles 200*a* and 200*b* are traveling in the same feeding section PSA, it is often preferable, as shown in FIG. 11, that the inverter circuits Isc1 and Isc2 are selected 180° out of phase with each other. If, however, immediately when the following vehicle 200*b* enters the power feeding section PSA, the phase of the inverter current Isc2 for the vehicle 200*b* is shifted 180° from that of the inverter current Isc1 for the preceding vehicle 200*a*, it may lead to a large degree of pulsation of electrical power. In order to alleviate such a problem, the phase difference between the inverter currents Isc1 and Isc2 may be changed gradually using information about locations of the vehicles 200*a* and 200*b*. Alternatively, after one of the vehicles 200*a* and 200*b*, e.g., the following vehicle 200*b* is brought to a stop, the inverter current therefore may be shifted by 180°.

In the third embodiment, the power feed controller 150, as described above, works to use the primary coil 112 which delivers electrical power to the vehicle following the first vehicle 200*a* to reduce the magnetic flux leakage caused by delivery of electrical power to the first vehicle 200*a*.

D. Fourth Embodiment

Figure 12:
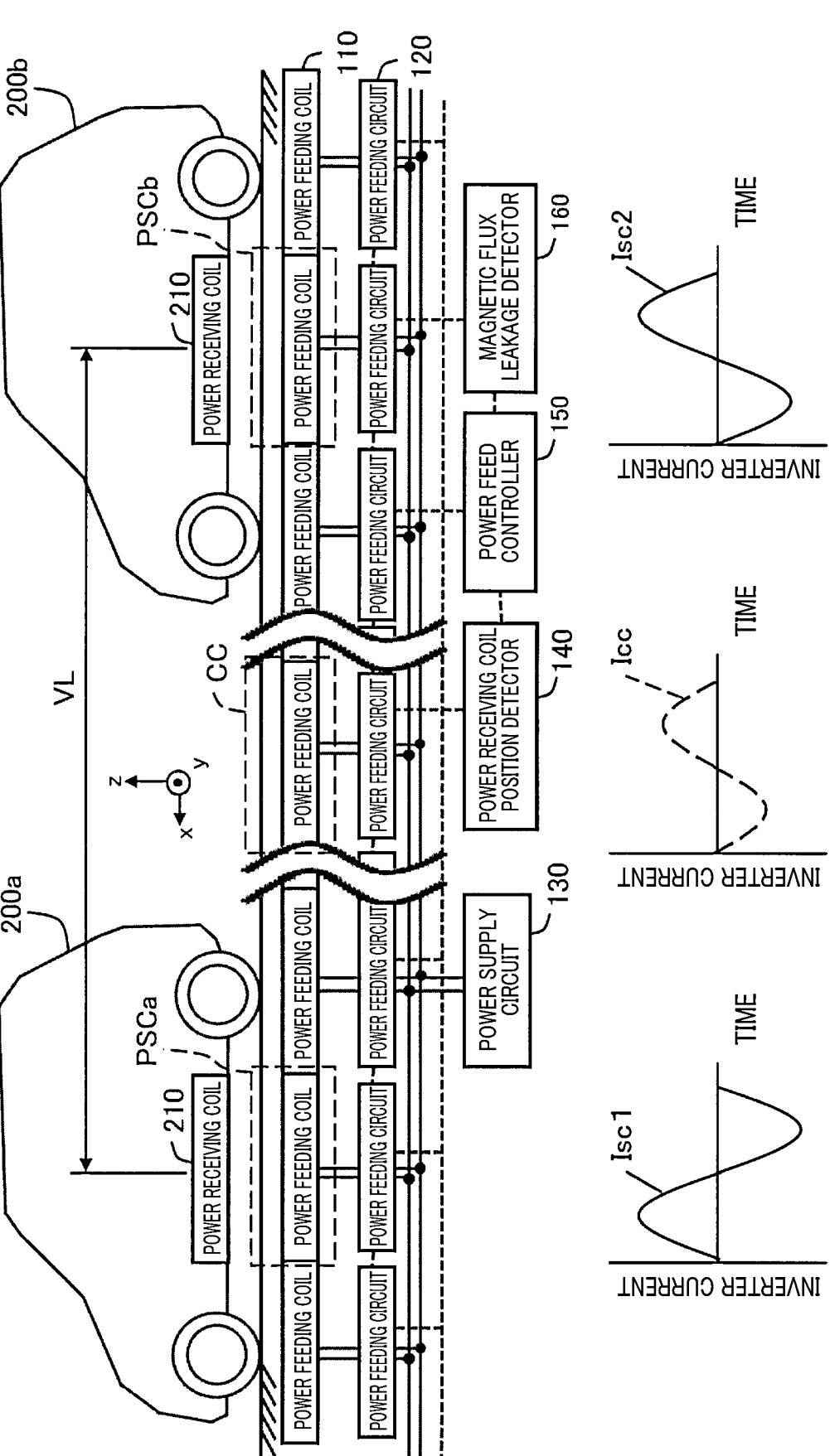
FIG. 12 is an explanatory view which demonstrates two vehicles traveling in a power feeding section in the third embodiment.

The fourth embodiment is, as illustrated in FIG. 12, designed for a case, like in the third embodiment, where the vehicles 200*a* and 200*b* are traveling on the same lane. The fourth embodiment uses the primary coil 112 as the canceller coil CC which is other than the power transmitting coils PSCa and PSCb which deliver electrical power to the vehicles 200*a* and 200*b* in order to reduce the magnetic flux leakage.

The reduction in magnetic flux leakage in the fourth embodiment is preferably achieved when the distance VL between the power receiving coils 210 installed in the vehicles 200*a* and 200*b* (i.e., an interval between the sec-ondary coils) is larger than a predetermined threshold value. For instance, when the distance VL is lower than or equal to the threshold value, the reduction in magnetic flux leakage may be achieved in the same way as in the third embodi-ment. Alternatively, when the distance VL is higher than the threshold value, the reduction in magnetic flux leakage may be achieved in the way in the fourth embodiment. The reduction in magnetic flux leakage may also be achieved in the way in the fourth embodiment when the vehicles 200*a* and 200*b* are traveling one in front of the other regardless of the distance VL. The distance VL between the power receiv-ing coils 210 of the vehicles 200*a* and 200*b* may be calculated using outputs from the power receiving coil position detector 140 which measures the positions of the power receiving coils 210.

In the fourth embodiment, when the vehicles 200*a* and 200*b* are traveling one in front of the other, the power feed controller 150, as described above, uses the primary coil 112 as the canceller coil CC which is other than the power transmitting coils PSCa and PSCb which supply electrical power to the vehicles 200*a* and 200*b*. This enables the reduction in magnetic flux leakage to be achieved even when an interval between the vehicles 200*a* and 200*b* is large.

E. Other Embodiments

The following various embodiments may be used instead of the above described embodiments.

Figure 13:
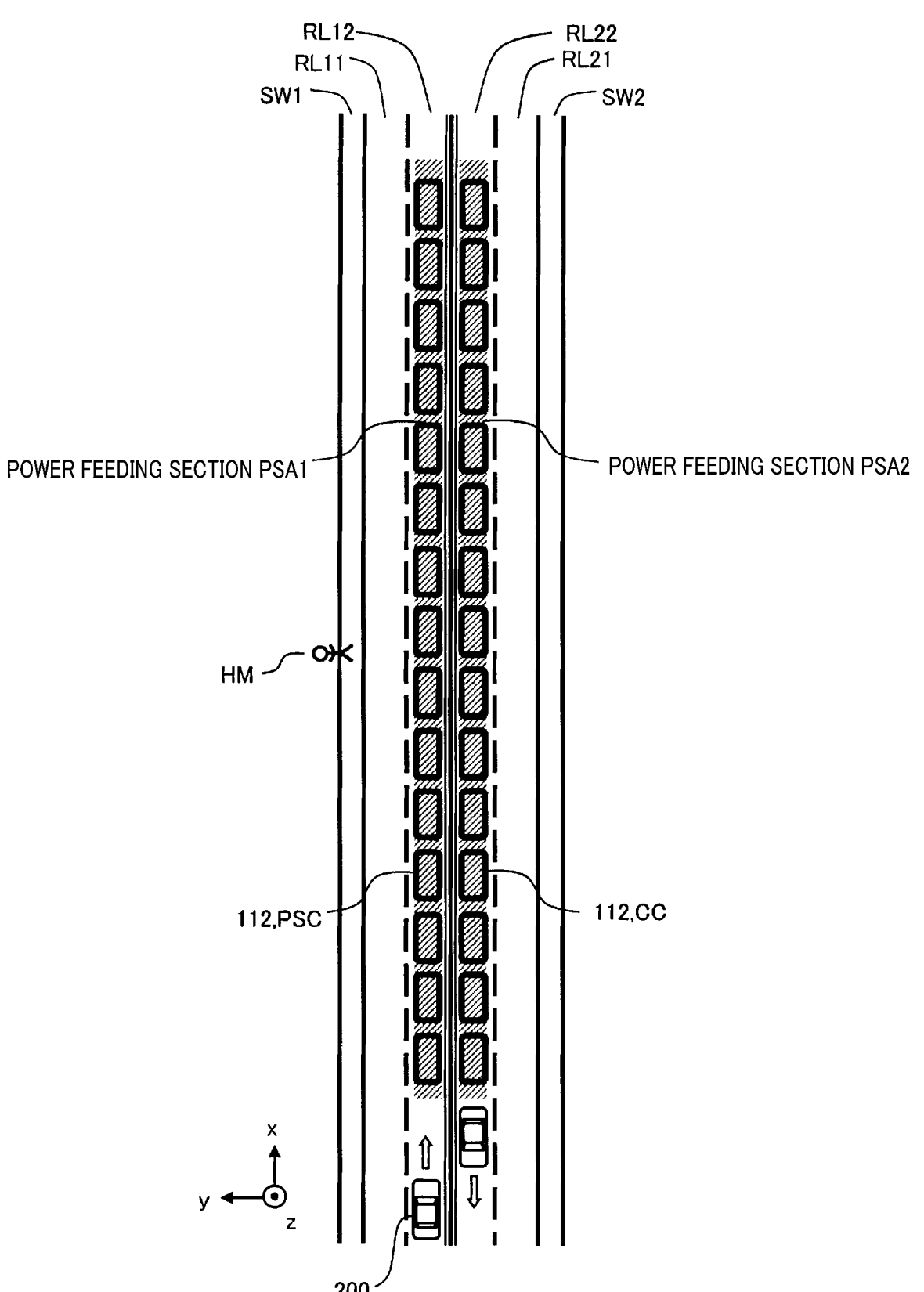
FIG. 13 is an explanatory view which illustrates power transmitting coils and canceller coils in the third embodiment.

There is a case, as demonstrated in FIG. 13, where the power feeding sections PSA1 and PSA2 are provided in the traffic lane RL12 and the oncoming traffic lane RL22, respectively. In this case, when the vehicle 200 travels in the traffic lane RL12, the primary coil 112 in the oncoming traffic lane RL22 which is located near the power transmit-ting coil PSC may be used as the canceller coil CC in order to reduce the magnetic flux leakage arising from energiza-tion of the power transmitting coil PSC. In the example in FIG. 13, the primary coil 112 which is arranged adjacent the power transmitting coil PSC in the y-direction is used as the canceller coil CC. This results in a reduction in magnetic flux leakage lateral to the vehicle 200. The canceller coil(s) CC which is located in the x-direction may be selected in the same way as described in the above embodiments.

Figure 14:
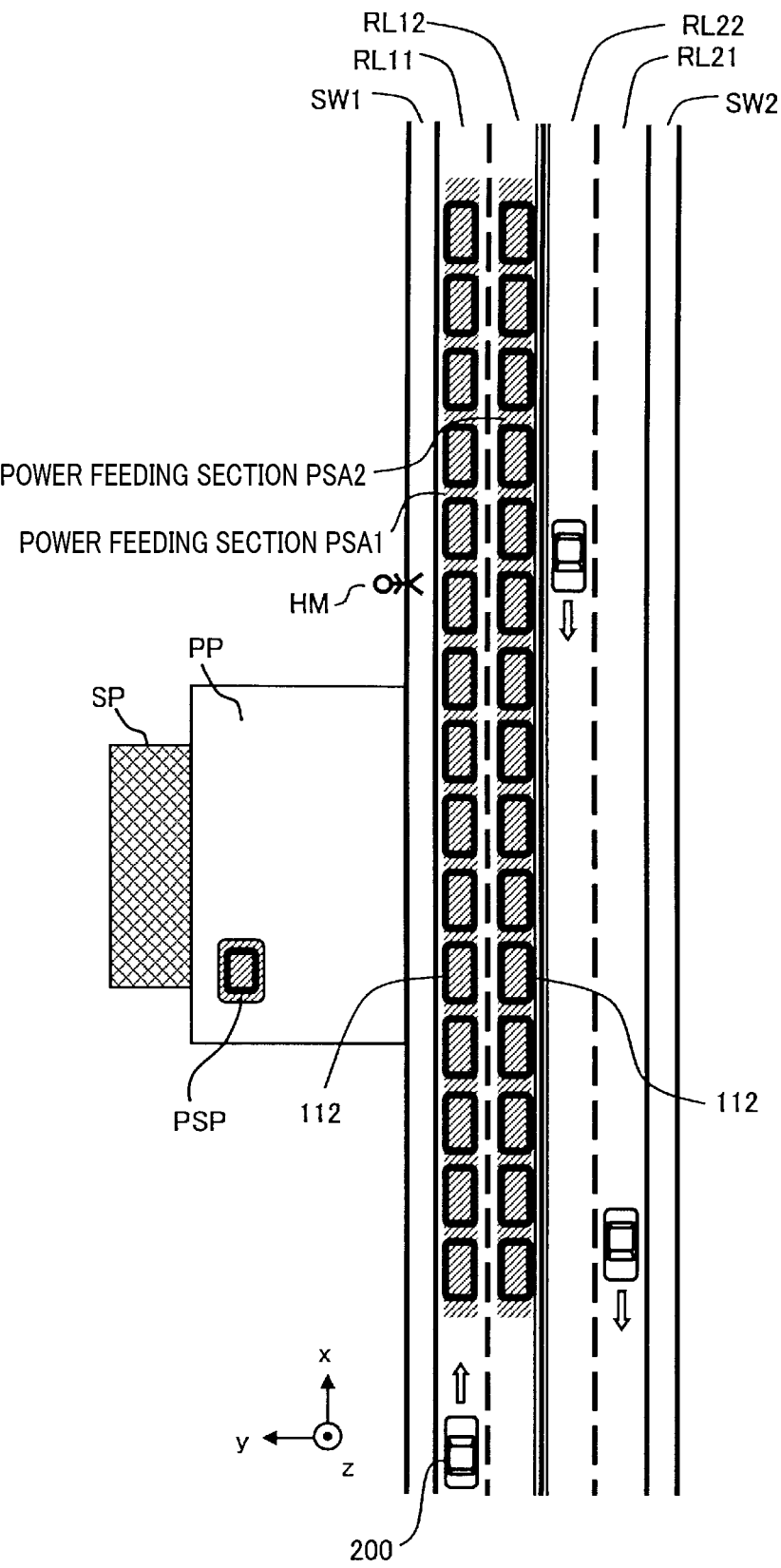
FIG. 14 is an explanatory view which demonstrates a vehicle traveling in a power feeding section in another embodiment.

There is also a case, as demonstrated in FIG. 14, where the traffic lanes RL11 and RL12 which are identical in vehicle-traveling direction with each other have the power feeding sections PSA1 and PSA2, respectively, which extend par-allel to each other. In this case, it is advisable that the primary coils 112 installed in the first power feeding section PSA1 and the primary coils 112 installed in the second power feeding section PSA2 have a phase difference in transmitting electrical power therebetween to reduce the magnetic flux leakage. For instance, an electrical power-transmitting current in the primary coil 112 installed in the first power feeding section PSA1 and that in the primary coil 112 installed in the second power feeding section PSA2 arranged adjacent the first power feeding section PSA1 in the y-direction may be provided to be 180° out of phase with each other. This results in a reduction in magnetic flux leakage in a direction perpendicular to the vehicle-traveling direction on the traffic lane.

In the example in FIG. 14, there are also a shop SP and a parking area PP located outside the sidewalk SW1, and a power supply pad PSP disposed in the parking area PP for delivery electrical power in the contactless mode to the parked vehicle. In this case, a primary coil installed in the power supply pad PSP may be used as the canceller coils CC to reduce the magnetic flux leakage resulting from delivery of electrical power to the vehicle traveling in the power feeding section PSA1 or PSA2. The power feed controller 150 of the contactless power feeding apparatus 100 (see FIG. 1) installed in the power feeding section PSA1 or PSA2 may wirelessly output a control request to the power supply pad PSP to reduce the magnetic flux leakage.

Figure 15:
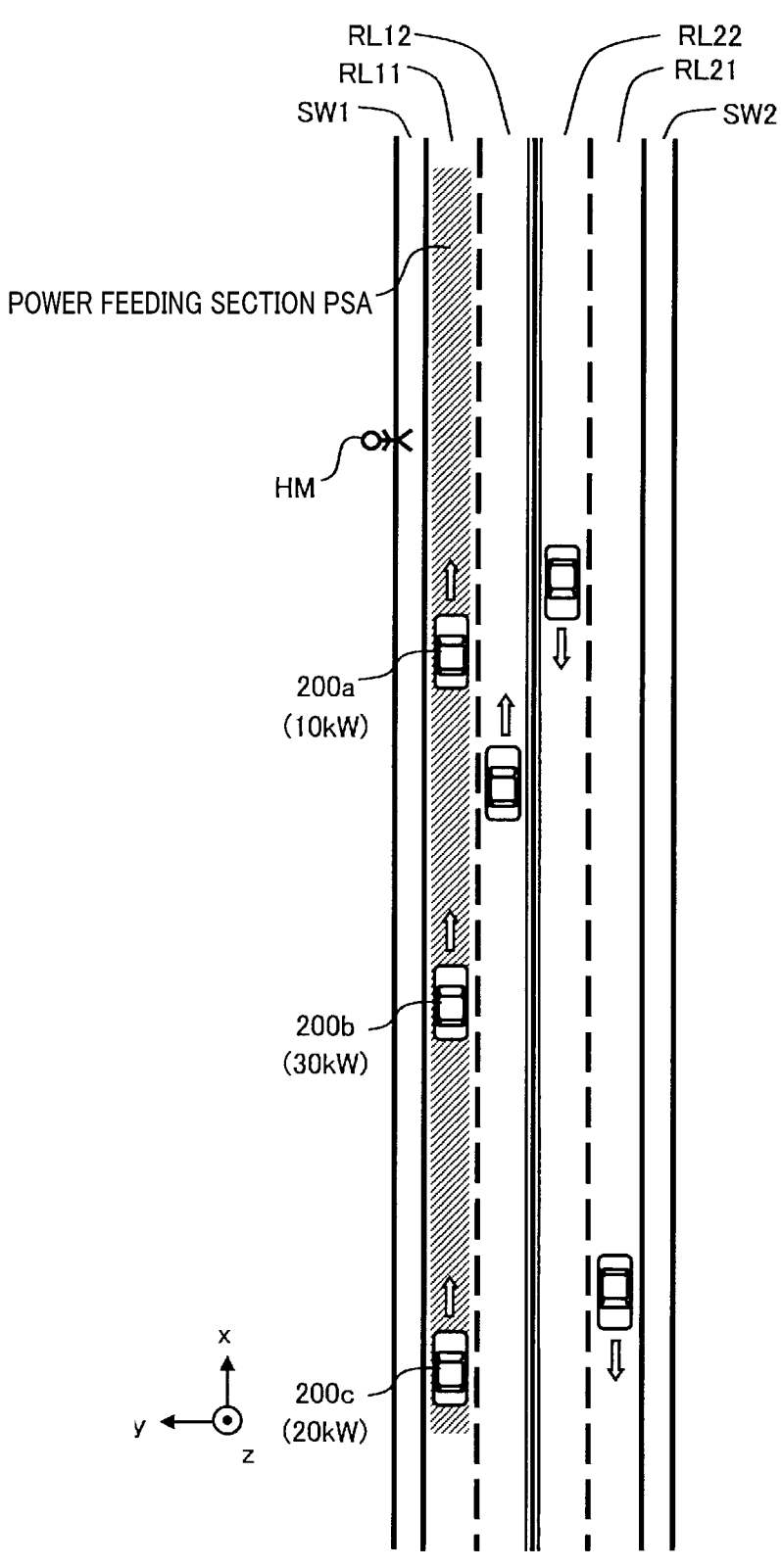
FIG. 15 is an explanatory view which shows an example of vehicles traveling in a power feeding section in another embodiment.

There is a case, as demonstrated in FIG. 15, where a plurality of vehicles 200*a* to 200*c* receive respective differ-ent amounts of electrical power while traveling simultane-ously in the same power feeding section PSA. In the example in FIG. 15, an electrical power of 10 kW is supplied to the first vehicle 200*a*. An electrical power of 30 kW is supplied to the second vehicle 200*b*. An electrical power of 20 kW is supplied to the third vehicle 200*c*. Such a differ-ence in supplied amount of electrical power depends upon a difference among capacities of the main batteries 230 installed in the vehicles 200*a* to 200*c*, states of charge (SOC) of the main batteries 230, or slops on which the vehicles 200*a* to 200*c* are traveling. In such a case, it is advisable that the phase of electrical power-transmitting currents be con-trolled to decrease a total amount of magnetic flux leakage depending upon the supplied amounts of electrical power to the vehicles 200*a* to 200*c*. For instance, in the example in FIG. 15, the electrical power-transmitting current for the second vehicle 200*b* is preferably set to be 180° out of phase with those for the first vehicle 200*a* and the third vehicle 200*c*. Such control may also be achieved in a case where four or more vehicles 200 receive electrical power while traveling simultaneously in the same power feeding section PSA.

Each of the above embodiments uses one(s) of the primary coils 112 to reduce the magnetic flux leakage, but however, may alternatively be designed to use the secondary coil(s) 212 to reduce the magnetic flux leakage. For instance, when the vehicle 200 in which the main battery 230 has a high enough state of charge (SOC) travels in the power feeding section, the control device 290 of the vehicle 200 may use electrical power produced by the main battery 230 to create a flow of electrical current in the secondary coil 212 for reducing the magnetic flux leakage. In other words, at least one of a first operation and a second operation may be executed to reduce the magnetic flux leakage. The first operation is executed by the power feed controller 150 to use a selected one (i.e., the selected primary coil 112) of the primary coils 112 other than the power transmitting coil PSC to reduce the magnetic flux leakage arising from energization of the power transmitting coil PSC. The second operation is executed by the control device 290 installed in the vehicle 200 to create a flow of electrical current in the secondary coil 212 when the vehicle 200 is not receiving the electrical power through the secondary coil 212 to reduce the magnetic flux leakage arising from energization of the power transmitting coil PSC.

Figure 16A:
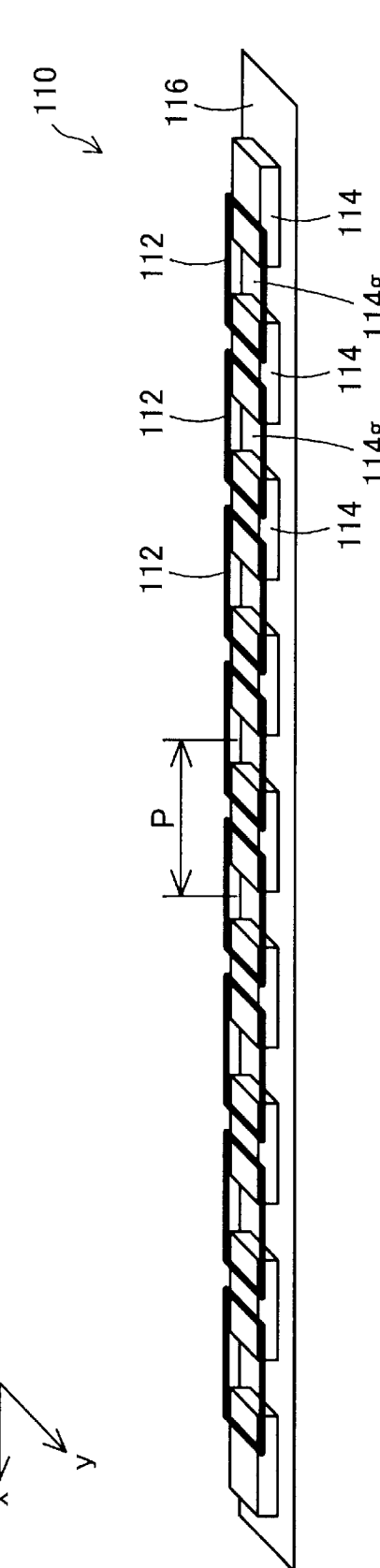
FIG. 16A is an explanatory view which illustrates a structure in which magnetic yokes of primary coils are equipped with cut-out portions.

The magnetic yokes 114 of the primary coils 112 may be, as illustrated in FIG. 16A, designed to have a plurality of cut-out portions 114*g* arranged at a constant pitch P away from each other in an array direction x that is a direction in which the primary coils 112 are arrayed. The cut-out portions 114*g* define gaps whose size is not zero and which are arranged in the array direction x of the primary coils 112. The cut-out portions 114*g* may alternatively be fully filled with non-magnetic material. In the example illustrated in FIG. 16A, the pitch P for the cut-out portions 114*g* is selected to be equal to a pitch for the primary coils 112. The cut-out portions 114*g* are preferably located at a middle between magnetic poles created upon excitation of the primary coils 112. The cut-out portions 114*g* of the magnetic yokes 114, as will be described later, serve to reduce the leakage of electromagnetic field.

Figure 16B:
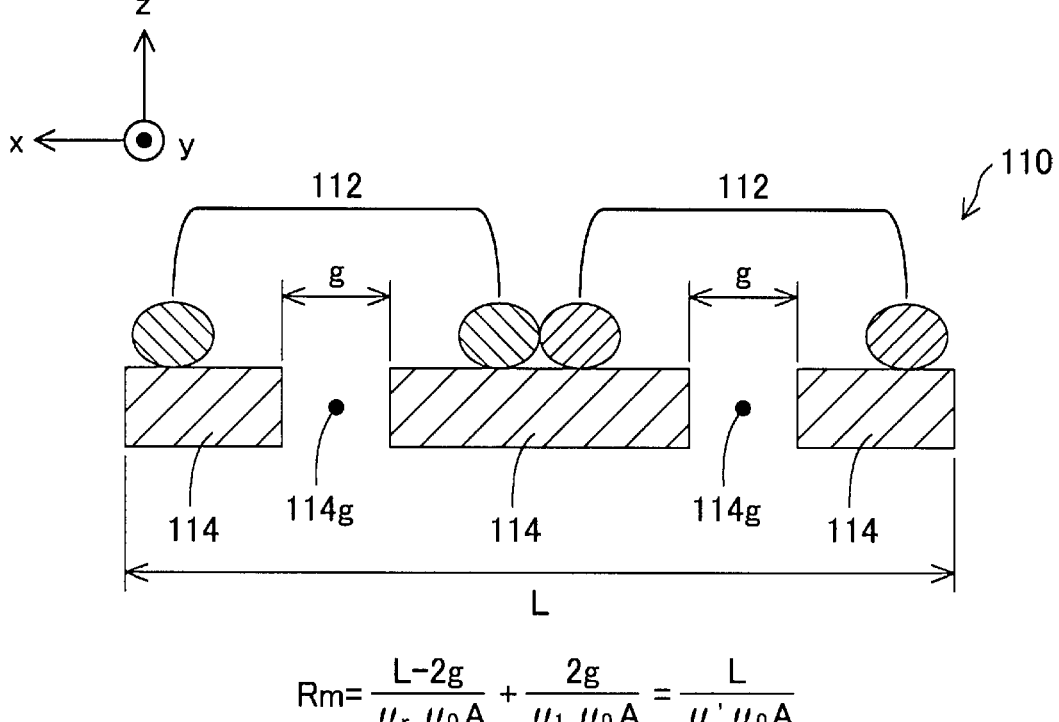
FIG. 16B is an explanatory view which shows a magnetic resistance of magnetic yokes with cut-out portions.

The magnetic resistance Rm of the magnetic yokes 114 including the cut-out portions 114*b* is, as indicated in FIG. 16B, given by the following equation.

$$Rm = \frac{L-2g}{\mu_r \mu_0 A} + \frac{2g}{\mu_1 \mu_0 A} = \frac{L}{\mu' \mu_0 A}$$

where A is a sectional area of the magnetic yokes 114, L is an overall length of the magnetic yokes 114 selected to calculate the magnetic resistance Rm, g is a cutout width that is a length of the cut-out portion 114*g*, $\mu_0$ is a permeability in vacuum, $\mu_1$ is a relative permeability of air, $\mu_r$ is a relative permeability of magnetic material of the magnetic yokes 114, and μ' is a total relative permeability. The cutout width g is set to a value other than zero. The overall length L of the magnetic yokes 114 is preferably selected to be an integral multiple of the pitch of the cut-out portions 114*g*. The total relative permeability μ' corresponds to a relative permeability of the magnetic yokes 114 equipped with the cut-out portions 114*g* if the magnetic yokes 114 are formed by an uniform material.

Figure 16C:
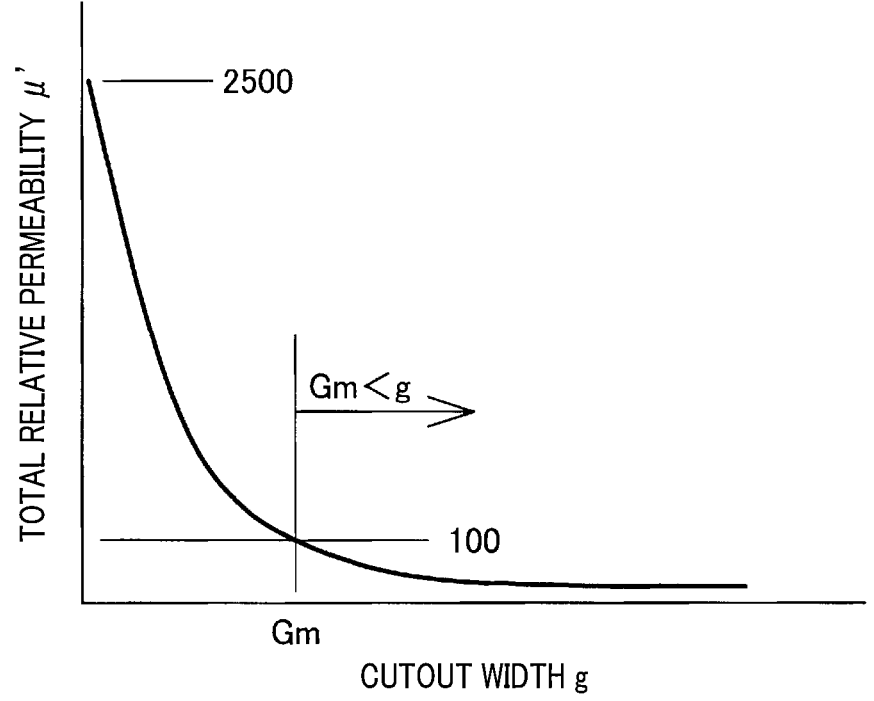
FIG. 16C is a graph which represents a relation between a cutout width of a magnetic yoke and a total relative permeability.

The total relative permeability μ' is, as can be seen in FIG. 16C, decreased with an increase in cutout width g of the magnetic yoke 114. A decrease in total relative permeability μ', as can be seen in FIG. 16D, results in a reduction in leakage of electromagnetic field without a large decrease in coefficient of coupling of the primary coil 112 and the secondary coil 212. It is, therefore, advisable that the total relative permeability μ' be selected to be less than 100. In other words, the cutout width g is preferably selected to be larger than a value Gm where the total relative permeability μ' is 100 in the characteristics demonstrated in FIG. 16C. This enables the leakage of electromagnetic field to be reduced without an undesirable large decrease in efficiency of the power delivery. Note that a decrease in total relative permeability μ' will result in a decrease in coefficient of coupling of the primary coil 112 and the secondary coil 212. Therefore, the total relative permeability μ' is preferably higher than or equal to 10, and more preferably higher than or equal to 50.

Figure 17A:
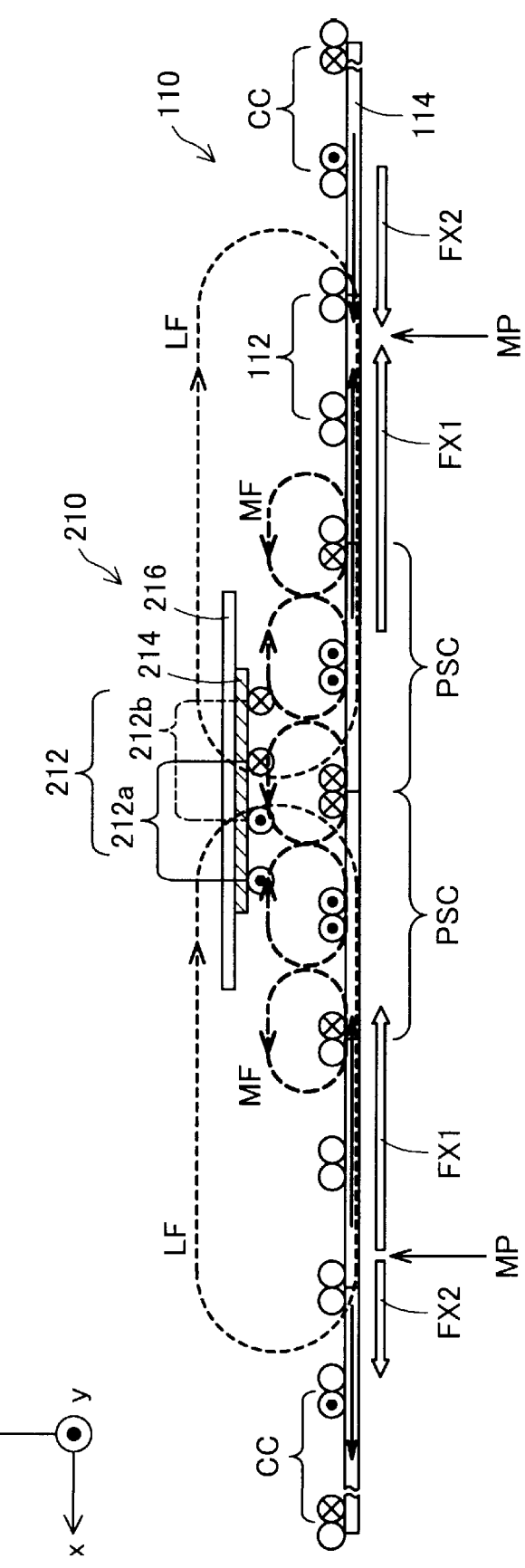
FIG. 17A is an explanatory view which demonstrates leakage of magnetic flux in use of magnetic yokes with no cut-out portions.
Figure 17B:
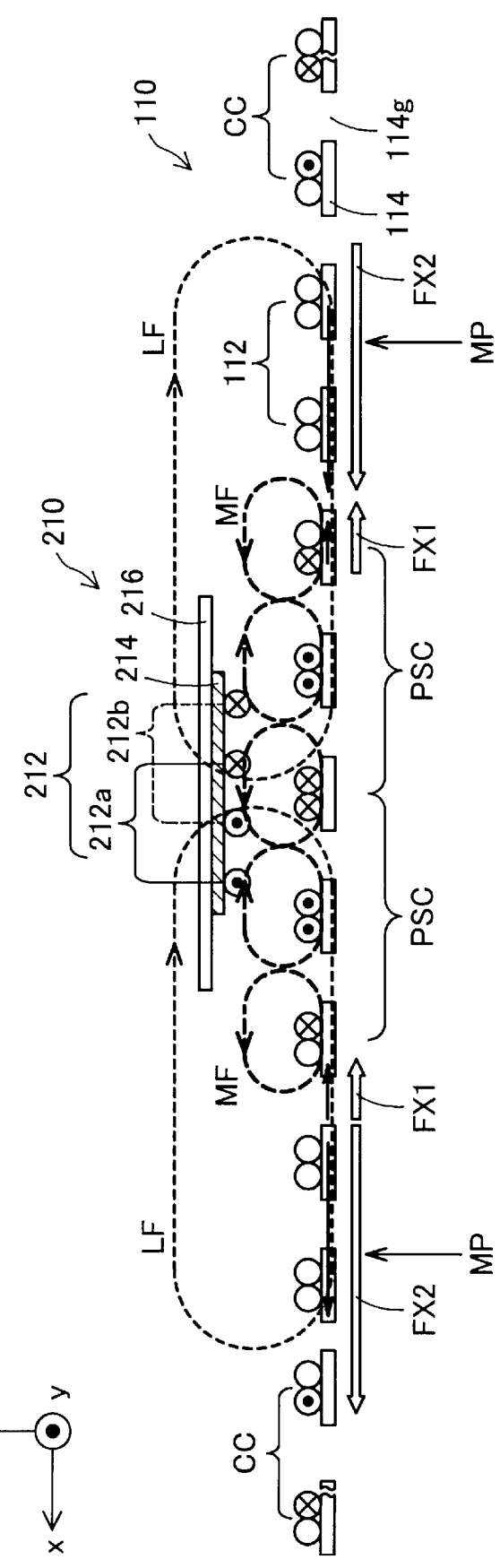
FIG. 17B is an explanatory view which demonstrates leakage of magnetic flux in use of magnetic yokes equipped with cut-out portions.

Comparison between FIGS. 17A and 17B shows that the cut-out portions 114*g* formed in the magnetic yoke 114 results in a decrease in leakage of electromagnetic field. The main magnetic flux MF created by the power transmitting coil PSC, as illustrated in FIG. 17A, propagates in the magnetic yoke 114. In the absence of the cut-out portion in the magnetic yoke 114 of the primary coil 112, the magnetic flux propagating through the magnetic yoke 114 hardly attenuates, so that the main magnetic flux MF reaches far. The magnetic flux FX1 moving through the magnetic yoke 114 due to the main magnetic flux MF is, therefore, very large. In contrast, the magnetic flux FX2 moving through the magnetic yoke 114 due to the leaked magnetic flux LF traveling through air is opposed in direction to the magnetic flux FX1 created by the main magnetic flux MF. If leakage of electromagnetic field is observed at a point MP within flows of the magnetic fluxes FX1 and FX2, there is high probability that a large magnetic field leakage is observed. There is also a probability that two magnetic fluxes which are oriented in opposite directions exist at the point MP of observation, which obstructs a reduction in magnetic flux leakage using the canceller coils. The magnetic flux FX1 of the main magnetic flux propagates far through the magnetic yokes 114, which leads to a risk that the magnetic flux leakages may be increased.

The formation of the cut-out portions 114*g* in the magnetic yokes 114, as can be seen in FIG. 17B, will result in a decrease in magnetic flux FX1 propagating through the magnetic yokes 114 due to the main magnetic flux MF. This causes magnetic fluxes near the point MP of observation of the leakage of electromagnetic field to be oriented substantially in the same direction, thereby resulting in a large reduction in leakage of electromagnetic field using the canceller coils CC.

Figure 18:
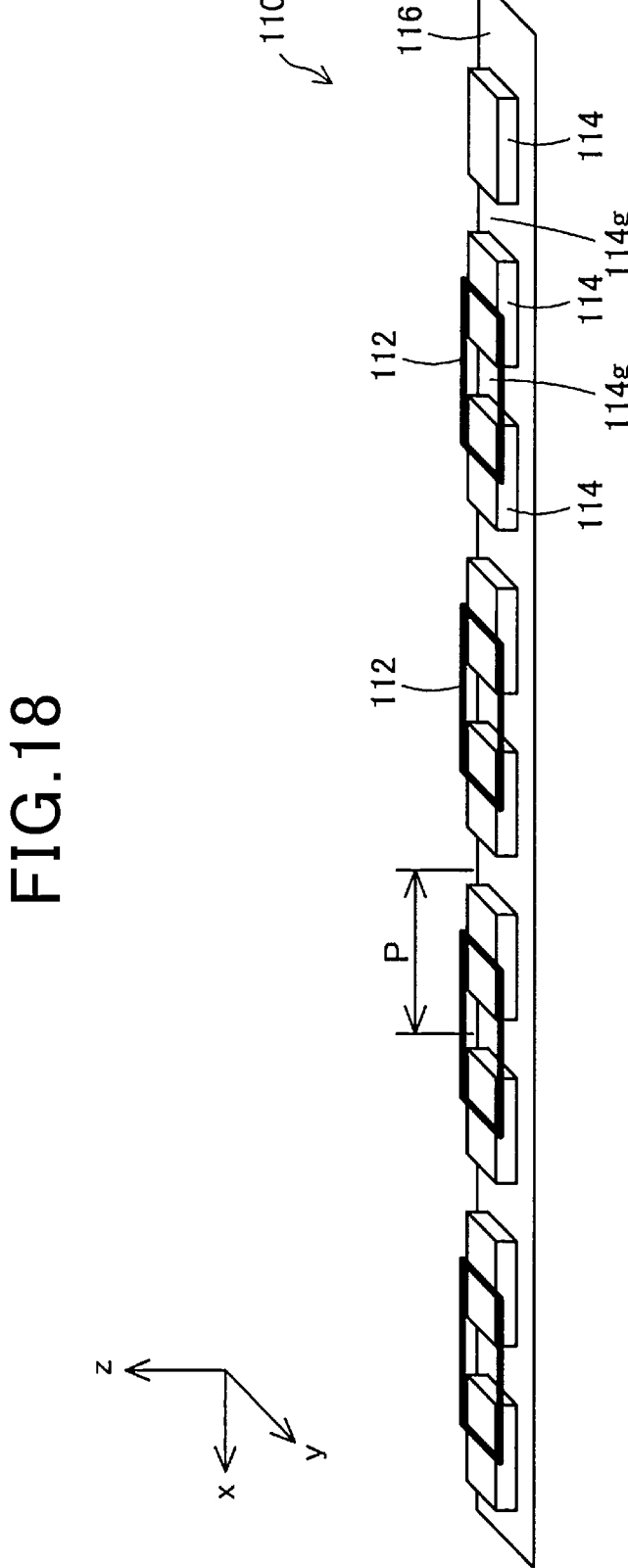
FIG. 18 is an explanatory view which illustrates another structure of magnetic yokes of primary coils equipped with cut-out portions.

Some of the primary coils 112 may be as illustrated in FIG. 18, omitted to be one-half of those illustrated in FIG. 16A. In other words, the primary coil 112 may be arrayed at a pitch away from each other that is two times the pitch P of the cut-out portions 114*g*. This arrangement will also be described later in detail.

Figure 19:
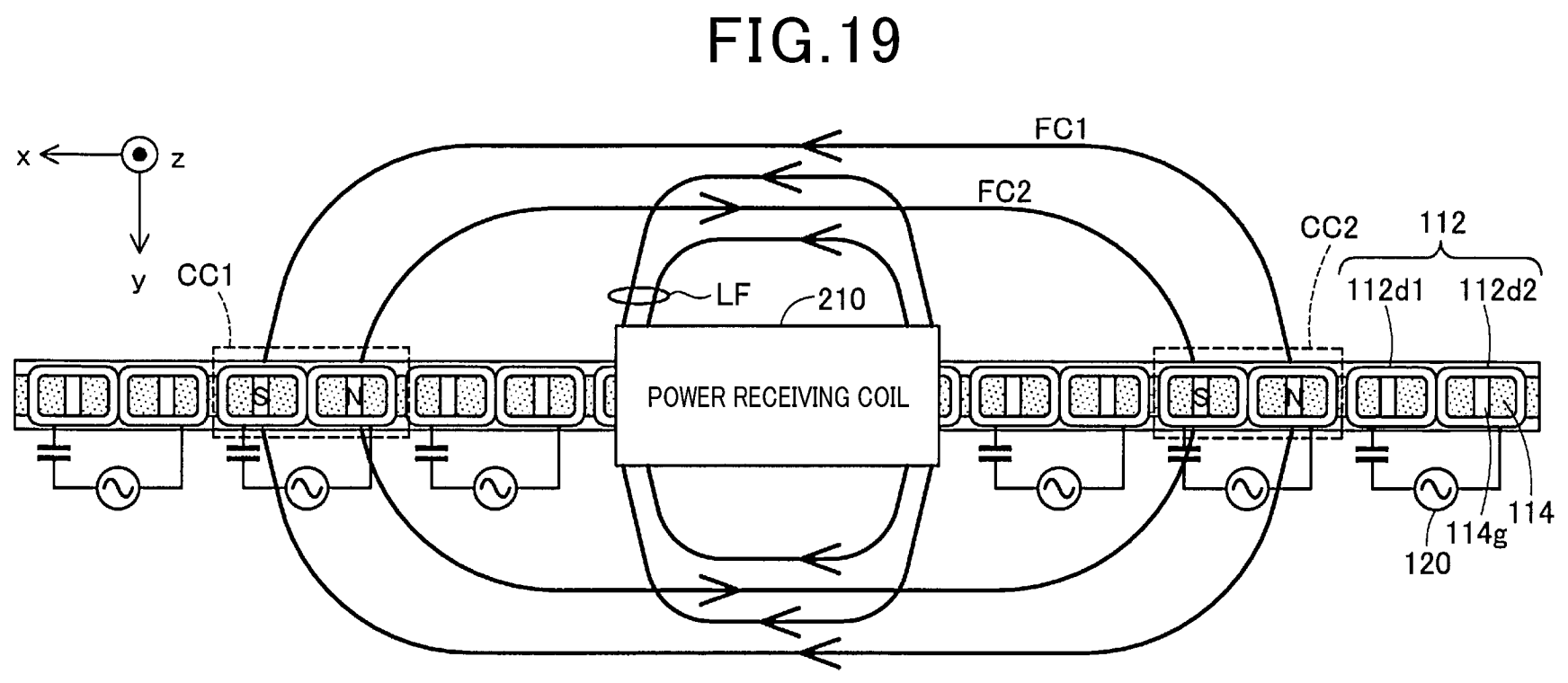

In an example shown in FIG. 19, the primary coils 112 are each designed as a DD coil including the first coil 112*d*1 and the second coil 112*d*2. The first coil 112*d*1 and the second coil 112*d*2 are opposed in winding direction to each other and arranged in contact with each other. In this example, each assembly of the primary coils 112 is driven by a corresponding one of the power feeding circuits 120 (i.e., an inverter). Therefore, when the primary coil 112 (the DD coil) is selected as the canceller coil CC and excited, one of the first coil 112*d*1 and the second coil 112*d*2 will have an S-pole, while the other will have an N-pole. In FIG. 19, the front canceller coil CC1 located ahead of the vehicle in the travel direction x and the rear canceller coil CC2 located behind the vehicle in the travel direction x are used. The canceller coils CC1 and CC2 create four magnetic poles which generate the magnetic fluxes FC1 and FC2 propagating through air. Additionally, the power delivery also results in leaked magnetic fluxes LF. The leaked magnetic fluxes LF arising from the power delivery are oriented in the same direction, while the magnetic fluxes FC1 and FC2 arising from the cancel current are oriented in opposite directions. One of the magnetic fluxes FC1 and FC2 is, therefore, oriented in the same direction as that produced by the secondary coil 212, while the other is oriented in a direction opposite that produced by the secondary coil 212. This causes the magnetic fluxes to be partially heightened and weakened, which does not contribute to a reduction in leakage of electromagnetic field.

Figure 20:
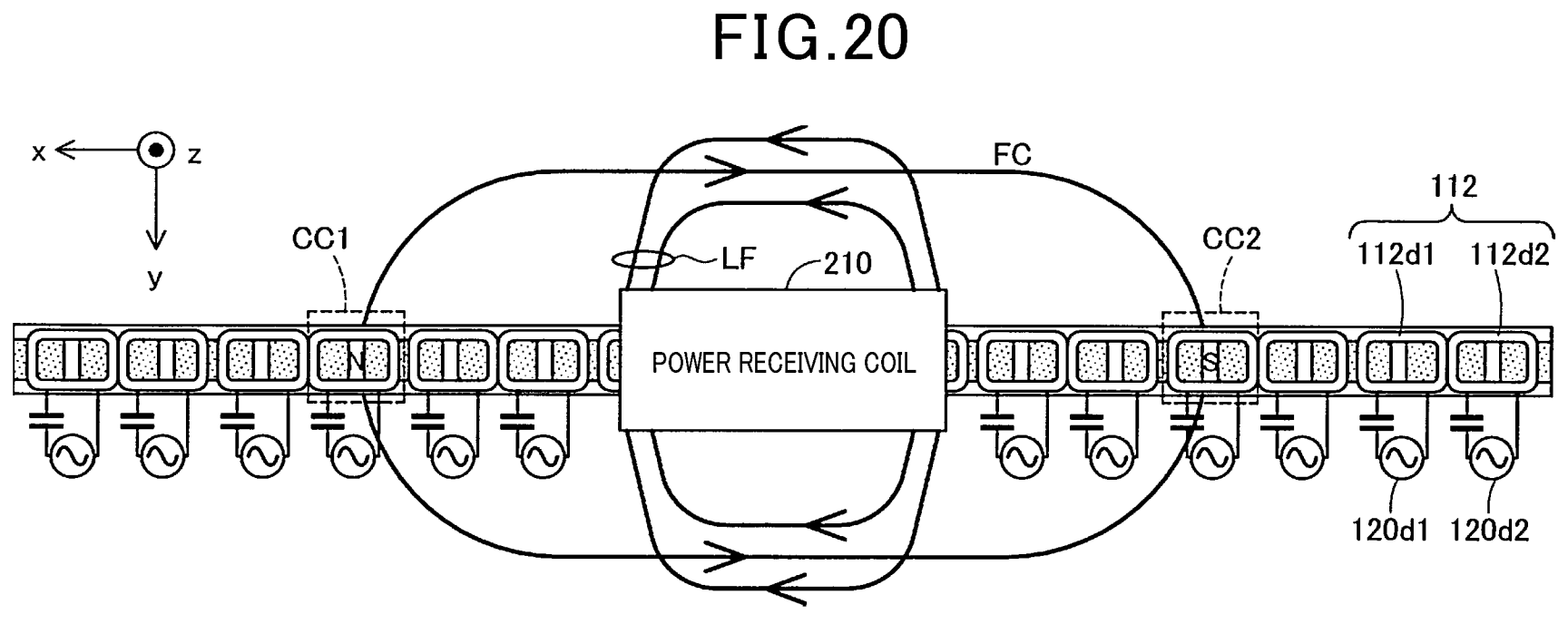

In an example shown in FIG. 20, the first coil 112d1 and the second coil 112d2 of each of the primary coils 112 designed as the DD coil are driven by the power feeding circuits 120d1 and l2d2, respectively. In this example, one of the coils 112d1 and 112d2 which constitute the DD coil is preferably used as the front canceller coil CC1, while the other is preferably used as the rear canceller coil CC2. This structure enables the coils and a direction of a flow of the cancel current to be selected, so that one of the front canceller coil CC1 and the rear canceller coil CC2 may have an S-pole, and the other may have an N-pole. These arrangements results in a decrease in magnetic flux FC which propagates through air due to excitation of the canceller coils as compared with the structure in FIG. 19, thereby reducing the leakage of magnetic flux. The magnetic flux FC which propagates through air due to the excitation of the canceller coils CC1 and CC2 is oriented in a direction opposite the magnetic flux LF occurring in the power receiving coil 210, so that they are cancelled each other to reduce the leakage of magnetic flux.

Figure 21:
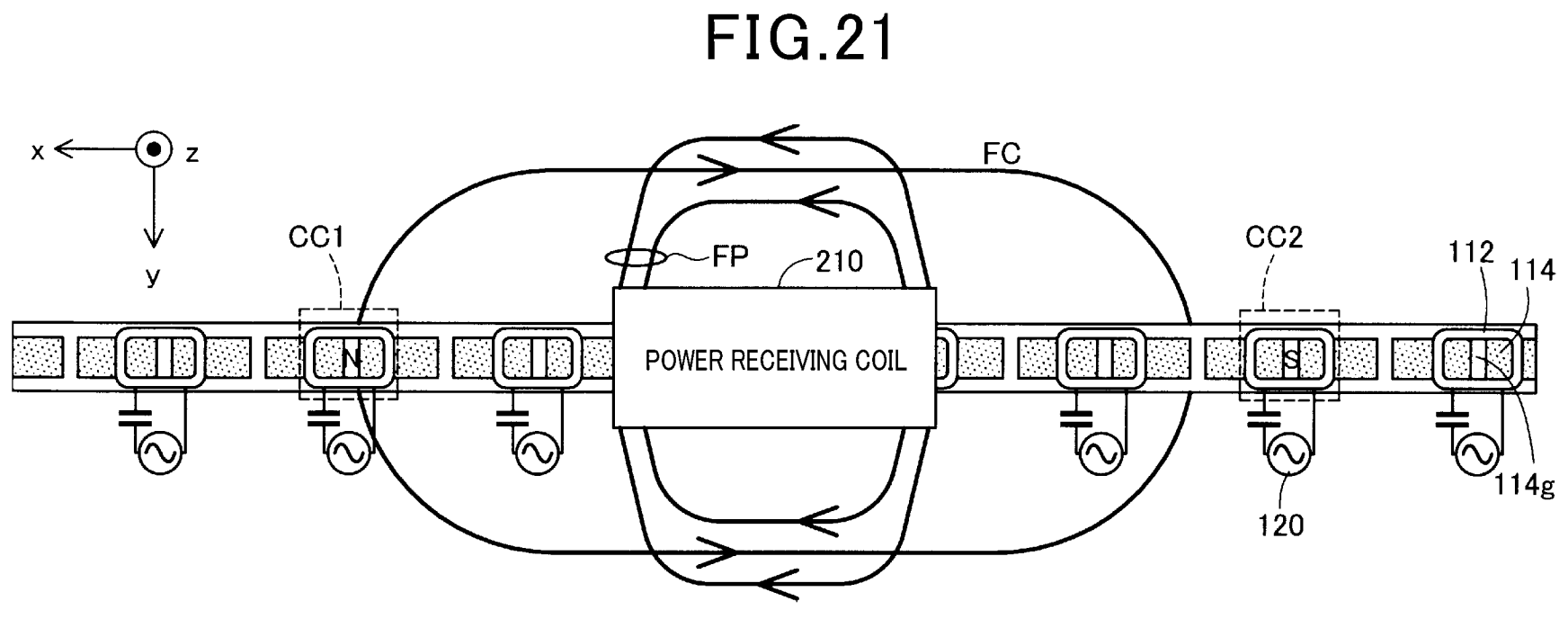

The structure in FIG. 21 is identical with that illustrated in FIG. 20 from which one of two coils constituting the DD coil is omitted. The structure of the primary coil 112 is equivalent to that illustrated in FIG. 18. Specifically, the primary coils 112 are arranged at a pitch two times the pitch P at which the cut-out portions 114g are arrayed. These arrangements provide substantially the same beneficial advantages as those of the structure in FIG. 20. The electrical currents flowing through the front canceller coil CC1 and the rear canceller coil CC2 are determined to be 180° out of phase with each other to have magnetic poles opposite each other in the front canceller coil CC1 and the rear canceller coil CC2. This structure enables the number of the power feeding circuits 120 to be decreased because the number of the primary coils 112 is reduced.

Figure 22A:
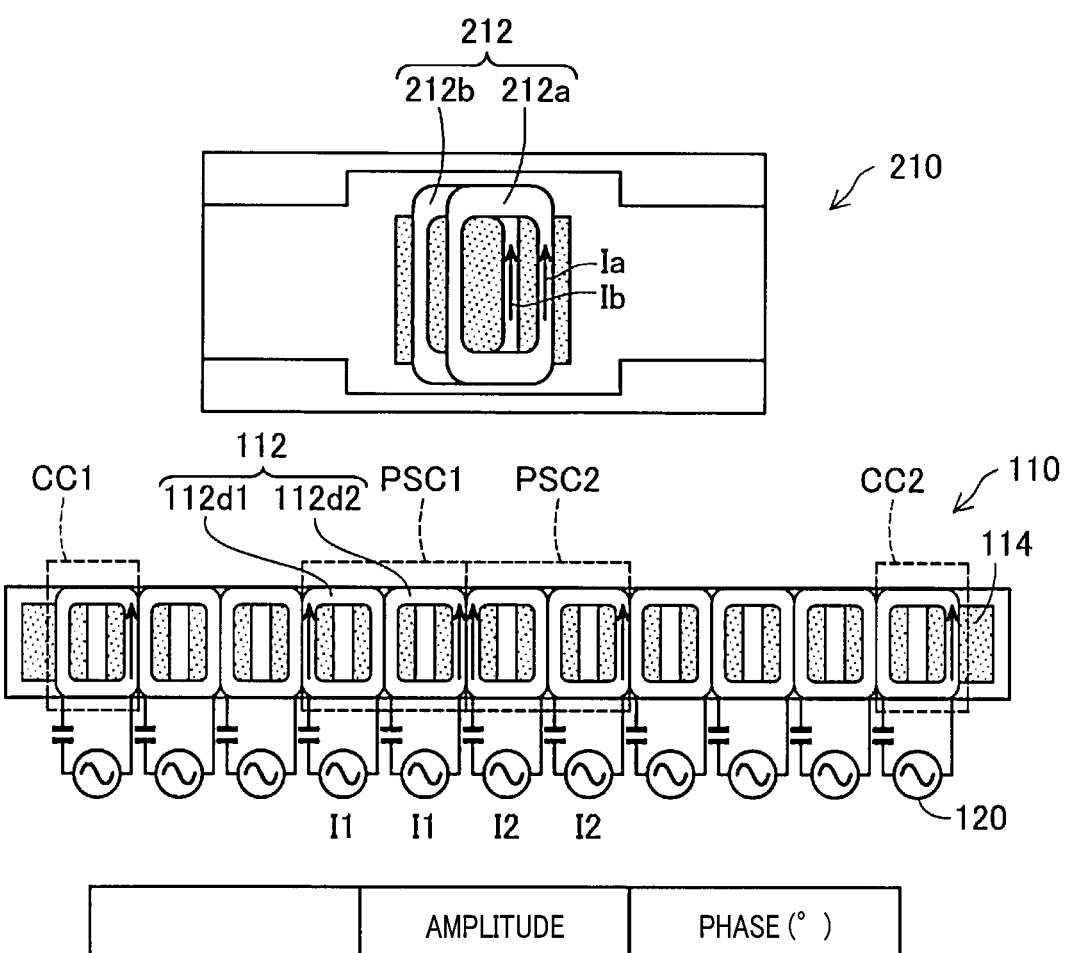
FIG. 22A is an explanatory view which power transmitting coils and canceller coils in use where a circuit structure is employed which has power feeding circuits two of which excite a DD coil of each primary coil.

FIG. 22A illustrates amplitudes and phases of electrical current flowing through the primary coil 112 and the secondary coil 212 of the structure in FIG. 20. In this example, the two primary coils 112 designed as a DD coil are used as the power transmitting coils PSC1 and PSC2. The secondary coil 212 is engineered as a two-phase coil including the A-phase coil 212a and the B-phase coil 212b. The currents I1 and I2 in the power transmitting coils PSC1 and PSC2, as indicated in a lower part of FIG. 22A, have amplitudes A1 and phases equal to each other. The current Ia in the A-phase coil 212a of the secondary coil 212 and the current Ib in the B-phase coil 212b of the secondary coil 212 have the amplitudes A2 which are equal to each other, but 180° out of phase with each other. The phases of the currents Ia and Ib in the secondary coil 212 are each shifted 90° from those of the currents I1 and I2 in the power transmitting coils PSC1 and PSC2. The front canceller coil CC1 and the rear canceller coil CC2 may be made of coils which are different in winding direction from each other and excited in the same phase or which are identical in winding direction with each other and excited in phases 180° shifted from each other. This reduces the leakage of magnetic flux.

Figure 22B:
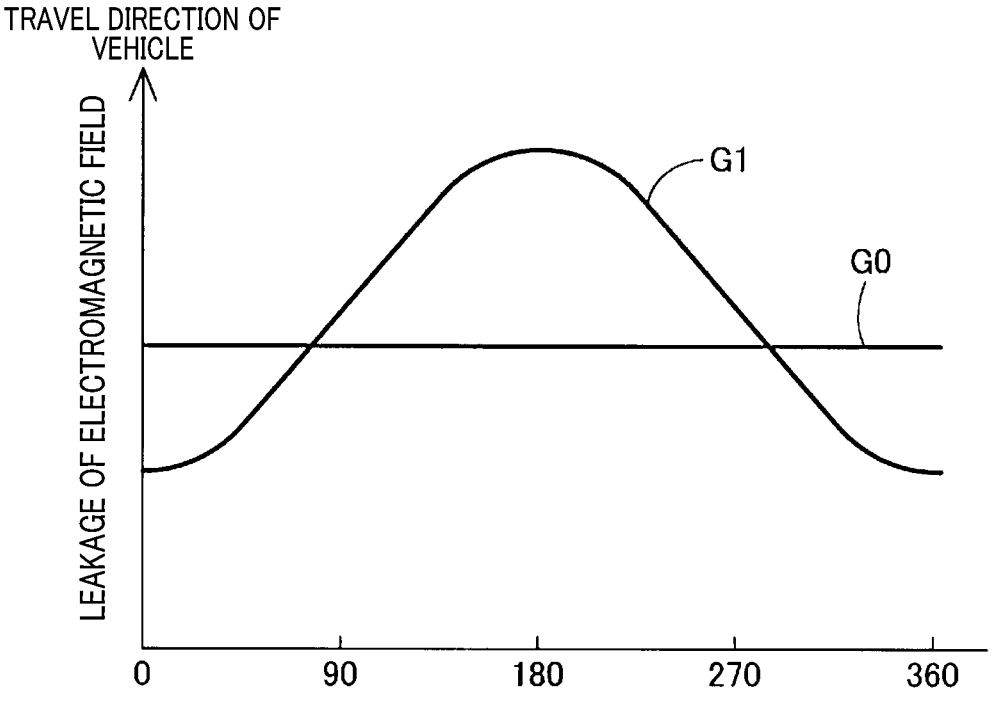
FIG. 22B is a graph which represents a relation between a current phase of a canceller coil and leakage of electromagnetic field in a traveling direction of a vehicle in the structure in FIG. 22A.
Figure 22C:
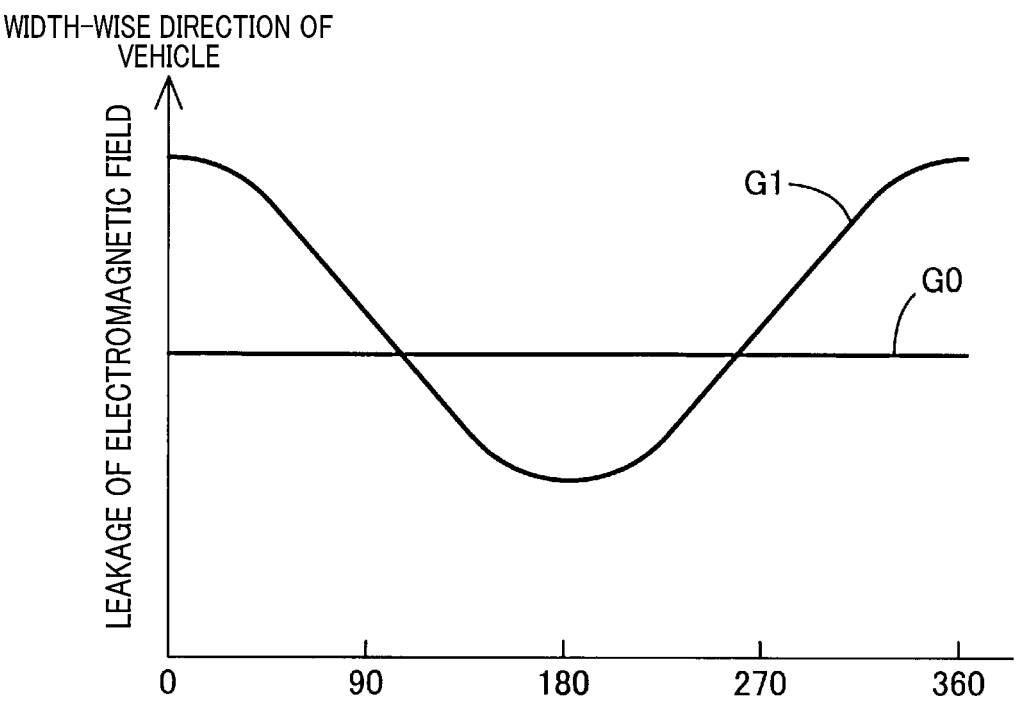
FIG. 22C is a graph which represents a relation between a current phase of a canceller coil and leakage of electromagnetic field in a width-wise direction of a vehicle in the structure in FIG. 22A.

The structure in FIG. 22A, as can be seen in FIGS. 22B and 22C, enables the leaked electromagnetic field G1 in use of the canceller coils CC1 and CC2 to be decreased as compared with the structure not using the canceller coils CC1 and CC2. The leaked electromagnetic fields oriented in the travel direction and width-wise direction of the vehicle, as can be seen in FIGS. 22B and 22C, depend upon phases of currents flowing in the canceller coils CC1 and CC2. Specifically, the leaked electromagnetic field in the travel direction of the vehicle is, as demonstrated in FIG. 22B, minimized when a phase difference between current flowing in each of the canceller coils CC1 and CC2 and that flowing in the A-phase coil 212a of the secondary coil 212 is zero degree. The leaked electromagnetic field in the width-wise direction of the vehicle is, as can be seen in FIG. 22C, minimized when a phase difference between current flowing in each of the canceller coils CC1 and CC2 and current flowing in the A-phase coil 212a of the secondary coil 212 is 180 degrees. For instance, the decrease in leakage of electromagnetic field in the width-wise direction of the vehicle is achieved preferably by setting the current in each of the canceller coils CC1 and CC2 to have a phase which is shifted by 180°+10° from that in the A-phase coil 212a.

Figure 23A:
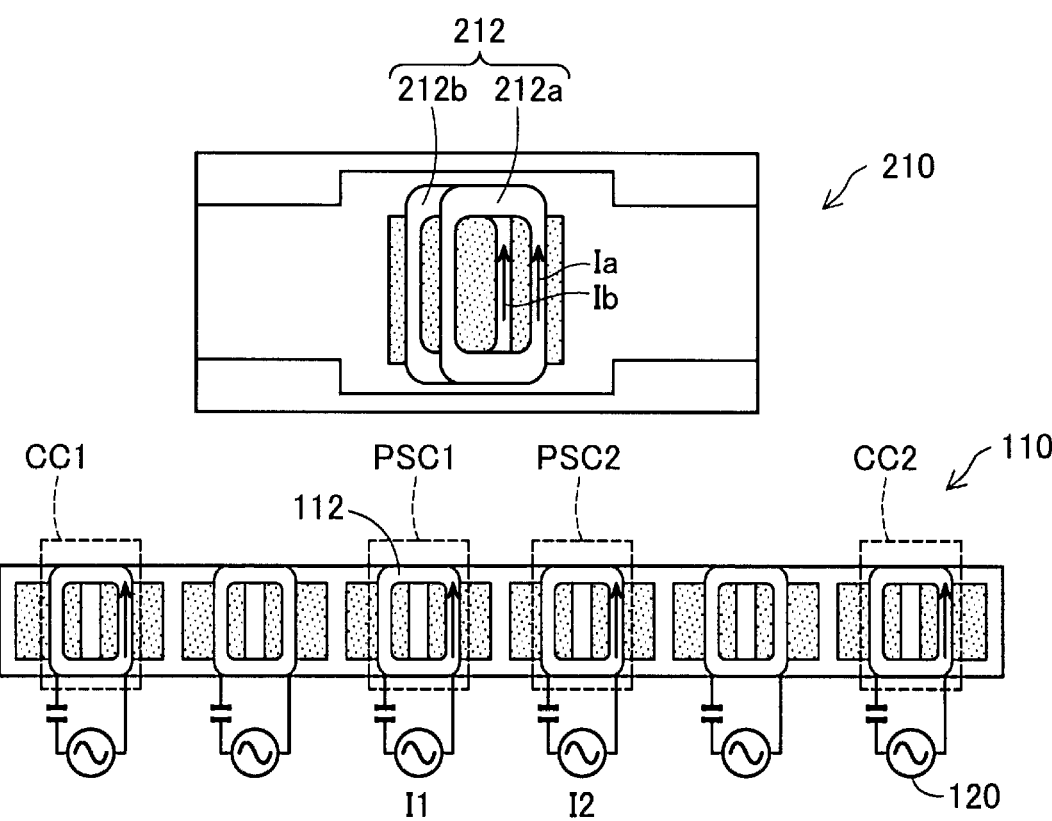
FIG. 23A is an explanatory view which illustrates an example where one of coils of the DD coil in FIG. 22A is omitted.

FIG. 23A shows amplitudes and phases of currents flowing in the primary coil 112 and the secondary coil 212 in the structure illustrated in FIG. 21. In this example, the two primary coils 112 which are each made of a single coil, not the DD coil are used as the power transmitting coils PSC1 and PSC2. The secondary coil 212 is made of a two-phase coil including the A-phase coil 212a and the B-phase coil 212b. The currents I1 and I2 in the power transmitting coils PSC1 and PSC2 are, as shown in a low portion of FIG. 23A and the currents Ia and Ib flowing in the secondary coil 212 are different in phase from those in FIG. 22A.

Figure 23B:
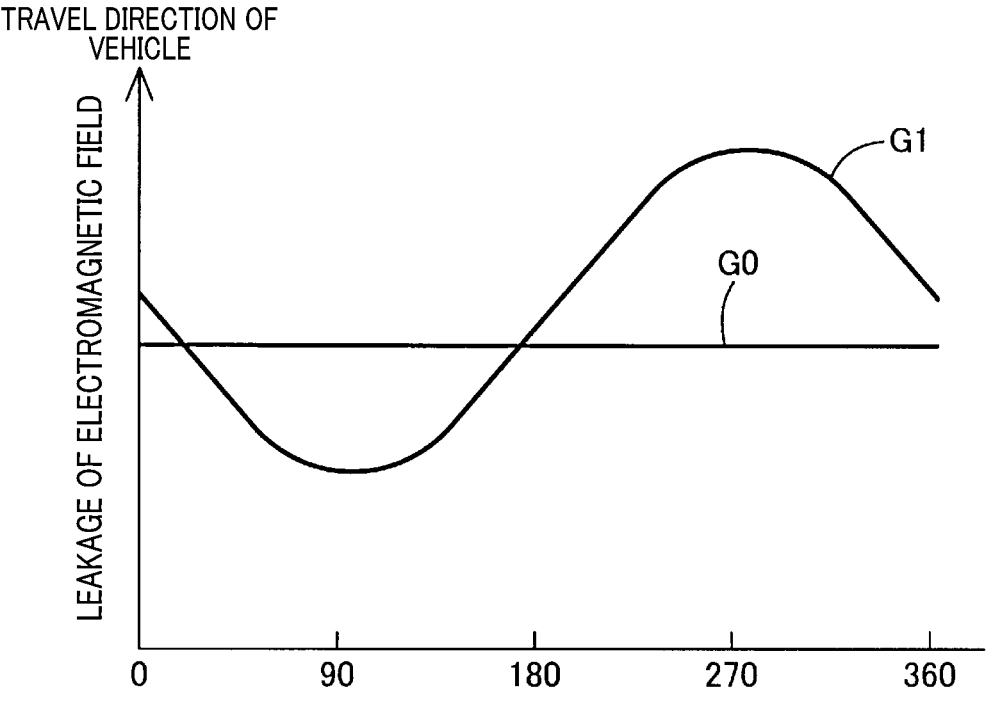
FIG. 23B is a graph which represents a relation between a current phase of a canceller coil and leakage of electromagnetic field in a traveling direction of a vehicle in the structure in FIG. 23A.
Figure 23C:
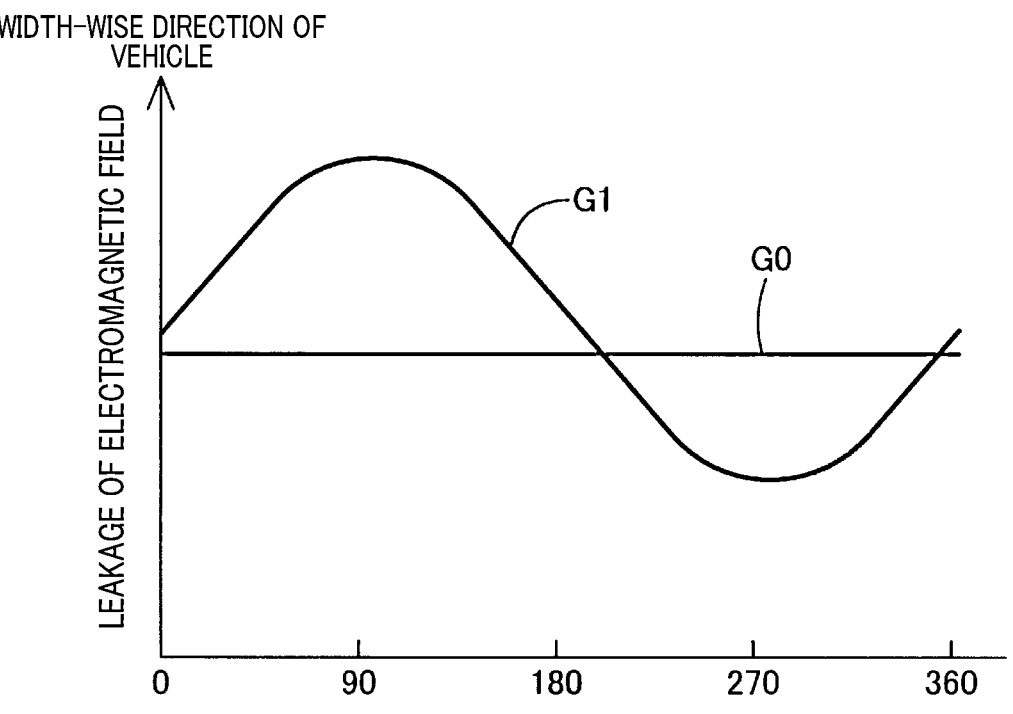
FIG. 23C is a graph which represents a relation between a current phase of a canceller coil and leakage of electromagnetic field in a width-wise direction of a vehicle in the structure in FIG. 23A.

The leaked electromagnetic field in the travel direction of the vehicle is, as demonstrated in FIG. 23B, minimized when a phase difference between current flowing in each of the canceller coils CC1 and CC2 and that flowing in the A-phase coil 212a of the secondary coil 212 is 90 degrees. The leaked electromagnetic field in the width-wise direction of the vehicle is, as can be seen in FIG. 23C, minimized when a phase difference between current flowing in each of the canceller coils CC1 and CC2 and current flowing in the A-phase coil 212a of the secondary coil 212 is 270 degrees. For instance, the decrease in leakage of electromagnetic field in the width-wise direction of the vehicle is achieved preferably by setting the current in each of the canceller coils CC1 and CC2 to have a phase which is shifted by 270°±10° from that in the A-phase coil 212a.

This disclosure is not limited to the above described embodiments and their modifications and may be realized in various ways without departing from the principle of the disclosure. The above described structures may be combined unless they are clearly incompatible with each other.

What is claimed is:

1. A contactless power feeding apparatus which feeds electrical power to a traveling vehicle in a contactless mode comprising:

a plurality of primary coils which are mounted on a road, each of the plurality of primary coils being configured to both: (i) deliver electrical power to a secondary coil installed in the traveling vehicle, and (ii) reduce a leakage of magnetic flux resulting from excitation of a primary coil selected as a power transmitting coil;

a power feed controller configured to:

select one of the primary coils as the power transmitting coil to achieve delivery of electrical power from the power transmitting coil to the secondary coil installed in the vehicle; and a coil position detector configured to measure a gap between the primary coils and the secondary coil, wherein the power feed controller is further configured to use a value of the gap to select one of the primary coils, which is not used in delivering the electrical power to the secondary coil in the vehicle, as a selected primary coil and use the selected primary coil to reduce a leakage of magnetic flux resulting from excitation of the power transmitting coil.

2. The contactless power feeding apparatus as set forth in claim 1, wherein the power feed controller works to control a circuit device which is connected to the selected primary coil to create a flow of electrical current through the selected primary coil in a direction to reduce the leakage of magnetic flux.

3. The contactless power feeding apparatus as set forth in claim 2, wherein the power feed controller produces an electrical current which flows through the selected primary coil in a phase suitable for reducing the leakage of magnetic flux.

4. The contactless power feeding apparatus as set forth in claim 3, wherein the power feed controller selects the electrical current flowing through the selected primary coil which is lower than that flowing through the power transmitting coil.

5. The contactless power feeding apparatus as set forth in claim 4, further comprising a magnetic flux leakage detector which detects the leakage of magnetic flux, and wherein the power feed controller works to control the electrical current flowing through the selected primary coil as a function of the leakage of magnetic flux detected by the magnetic flux leakage detector.

6. The contactless power feeding apparatus as set forth in claim 2, wherein the power feed controller uses, as the selected primary coil, one of the primary coils which delivers electrical power to a second vehicle other than said vehicle.

7. The contactless power feeding apparatus as set forth in claim 1, wherein the power feed controller short-circuits ends of the selected primary coil to reduce the leakage of magnetic flux.

8. A contactless power feeding system which uses a plurality of primary coils mounted on a road and a secondary coil installed in a vehicle, the system comprising:

a power feed controller configured to:

select one of the primary coils as a power transmitting coil to achieve feeding of electrical power from the power transmitting coil to the secondary coil, each of the plurality of primary coils being configured to both: (i) deliver the electrical power to the vehicle in a contactless mode during traveling of the vehicle, and (ii) reduce a leakage of magnetic flux resulting from excitation of a primary coil selected as the power transmitting coil;

a coil position detector configured to measure a gap between the primary coils and the secondary coil; and a control device which controls operation of the secondary coil, wherein at least one of a first operation and a second operation is executed, the power feed controller is configured to execute the first operation to use a value of the gap to select one of the primary coils, which is not used in delivering the electrical power to the vehicle, to reduce the leakage of magnetic flux resulting from excitation of the power transmitting coil, and the control device is configured to execute the second operation to create a flow of electrical current through the secondary coil when the secondary coil is not receiving the electrical power to reduce the leakage of magnetic flux arising from the excitation of the power transmitting coil.

\* \* \* \* \*